(12) United States Patent
Furui et al.

(10) Patent No.: US 9,535,194 B2
(45) Date of Patent: Jan. 3, 2017

(54) OPTICAL SHEET FOR REDUCING SCINTILLATION EFFECTS IN TOUCH PANELS AND DISPLAY PANELS

(71) Applicant: DAI NIPPON PRINTING CO., LTD., Tokyo (JP)

(72) Inventors: Gen Furui, Okayama (JP); Jun Tsujimoto, Yokohama (JP); Aya Naitou, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 150 days.

(21) Appl. No.: 14/643,550

(22) Filed: Mar. 10, 2015

(65) Prior Publication Data

US 2015/0260882 A1   Sep. 17, 2015

(30) Foreign Application Priority Data

Mar. 11, 2014 (JP) ................. 2014-048110
Mar. 11, 2014 (JP) ................. 2014-048118
Mar. 11, 2014 (JP) ................. 2014-048120

(51) Int. Cl.
*G02B 5/02* (2006.01)
*B05D 5/06* (2006.01)
*G06F 3/041* (2006.01)
*G02F 1/1335* (2006.01)

(52) U.S. Cl.
CPC ............... *G02B 5/0221* (2013.01); *B05D 5/06* (2013.01); *G06F 3/0412* (2013.01); *G02F 2001/133507* (2013.01)

(58) Field of Classification Search
CPC ........... G06F 3/0412; G02B 1/10; G02B 5/02; G02B 5/0221; G02B 5/021; G02B 5/30; G02B 5/3033; G02F 1/1335; G02F 1/133502; G02F 1/133504; G02F 2001/133507; B05D 5/06; B29D 11/00865; B29D 11/0074

See application file for complete search history.

(56) References Cited

U.S. PATENT DOCUMENTS 6,525,792 B1 * 2/2003 Fujioka ............... G02B 5/0221
                                                       349/113

FOREIGN PATENT DOCUMENTS

| JP | 11-305010 | 11/1999 |
|---|---|---|
| JP | 2002-196117 | 7/2002 |
| JP | 2002-267818 | 9/2002 |
| JP | 2008-158536 | 7/2008 |
| JP | 2009-86410 | 4/2009 |
| JP | 2009-128393 | 6/2009 |
| JP | 2009-288650 | 12/2009 |
| JP | 2011-253106 | 12/2011 |
| WO | 2007/111026 | 10/2007 |

* cited by examiner

*Primary Examiner* — Larry Sternbane
(74) *Attorney, Agent, or Firm* — Hamre, Schumann, Mueller & Larson, P.C.

(57) ABSTRACT

An optical sheet used as a component for a touch panel or a display element of a display device is capable of imparting a variety of characteristics such as anti-glare properties and preventing the scintillation of image light in ultrahigh-definition display elements having a pixel density of 300 ppi or more. The optical sheet has an uneven shape on a surface, and the uneven shape satisfies at least one of three disclosed conditions relating to the inclination angles of the uneven portions of the sheet and the distribution curves of the inclination angles.

8 Claims, 6 Drawing Sheets

OPTICAL SHEET FOR REDUCING SCINTILLATION EFFECTS IN TOUCH PANELS AND DISPLAY PANELS

FIELD OF THE INVENTION

The present invention relates to a touch panel, a display device, an optical sheet, a method for selecting an optical sheet, and a method for manufacturing an optical sheet.

BACKGROUND OF THE INVENTION

Recently, mobile information terminal devices which have an interactive communication function and are equipped with a transparent touch panel for information display and information input, which are represented by tablet PCs and smartphones, have been widely distributed not only in Japan but also across the globe.

In spite of the presence of resistance film-type touch panels which are excellent in terms of cost, electrostatic capacitance-type touch panels, particularly, projection electrostatic capacitance-type touch panels have been increasingly demanded as transparent touch panels since gesture operations such as multi-touch are possible and the image quality of ultrahigh-definition display elements is not easily impaired.

In some cases, an anti-glare sheet having an uneven structure is installed on the surface of a touch panel to prevent the reflection of external light.

Furthermore, there are cases in which optical sheets having an uneven structure are used as a base material for the outermost front surface, an internal base material, and a base material for the outermost back surface in a touch panel for the adhesion and prevention of interference fringes between members constituting the touch panel, the adhesion and prevention of interference fringes between the touch panel and display elements, and the like.

However, in a case in which an optical sheet having an uneven structure such as an anti-glare film is used, there is a problem in that the uneven structure causes a phenomenon (scintillation) in which subtle luminance unevenness appears on image light, and display quality degrades. Particularly, in recent display elements having ultrahigh definition (pixel density of 300 ppi or more), the scintillation problem is becoming more serious.

As techniques to prevent scintillation arising from surface unevenness, there have been proposed techniques of the patent documents 1 to 9.

Patent Documents

Patent document 1: Japanese Patent Laid-Open Publication No. 11-305010
Patent document 2: Japanese Patent Laid-Open Publication No. 2002-267818
Patent document 3: Japanese Patent Laid-Open Publication No. 2009-288650
Patent document 4: Japanese Patent Laid-Open Publication No. 2009-86410
Patent document 5: Japanese Patent Laid-Open Publication No. 2009-128393
Patent document 6: Japanese Patent Laid-Open Publication No. 2002-196117
Patent document 7: International Patent Publication No. 2007/111026.
Patent document 8: Japanese Patent Laid-Open Publication No. 2008-158536
Patent document 9: Japanese Patent Laid-Open Publication No. 2011-253106

SUMMARY OF THE INVENTION

The patent documents 1 and 2 are about techniques that improve scintillation by imparting internal haze. However, in ultrahigh-definition display elements having a pixel density of 300 ppi or more, scintillation tends to intensify, and thus it is necessary to further increase the degree of internal haze to suppress scintillation using internal haze only. In addition, there is a tendency for great internal haze to deteriorate resolution, and such a tendency is stronger in ultrahigh-definition display elements. Therefore, even when attention is paid to internal haze as in the patent documents 1 and 2, it has not been possible to obtain an optical sheet suitable for ultrahigh-definition display elements having a pixel density of 300 ppi or more.

The patent documents 3 to 9 are about techniques to impart anti-glare properties and improve scintillation by designing a specific shape as the surface shape of an optical sheet. However, even with the techniques of the patent documents 3 to 9, the prevention of scintillation in ultrahigh-definition display elements having a pixel density of 300 ppi or more is not possible.

The present invention has been made in consideration of the above-described circumstances, and an object of the present invention is to provide a touch panel, a display device, and an optical sheet which are capable of preventing the scintillation of image light in ultrahigh-definition display elements having a pixel density of 300 ppi or more even in a case in which the display elements have an uneven structure. In addition, the present invention provides a selection method and a manufacturing method of an optical sheet for preventing the scintillation of image light in ultrahigh-definition display elements having a pixel density of 300 ppi or more.

The present inventors carried out intensive studies regarding the surface shape of an optical sheet that prevents scintillation to solve the above-described problems. First, regarding the causes of scintillation, the distortion of transmitted light caused by the uneven shape when image light passes through an optical sheet having surface unevenness is considered as a cause. Therefore, in the related art, in order to prevent scintillation, the inclination angles of convex portions and concave portions were designed to be small so as to mitigate the degree of unevenness as described in the patent documents 3 to 9. However, with this design, while it was possible to prevent scintillation in display elements having a low pixel density, it was not possible to prevent scintillation in ultrahigh-definition display elements having a pixel density of 300 ppi or more.

The present inventors further repeated studies, and surprisingly found that, conversely, when the degree of unevenness is increased up to a certain level, there is a tendency that scintillation can be prevented. However, there are cases in which scintillation cannot be prevented by only an increase in the degree of unevenness, and when the degree of unevenness is excessively increased, in addition to scintillation, the optical characteristics are adversely affected in some cases. As a result, the present inventors repeated studies regarding appropriate unevenness, and completed the present invention.

That is, the present invention provides the touch panel, a display device, an optical sheet, a method for selecting an optical sheet, and a method for manufacturing an optical sheet of the following [1] to [9],

[1] A touch panel including an optical sheet as a component, in which the optical sheet has an uneven shape on a surface, the uneven shape satisfies at least one condition selected from the following (A) to (C), and the touch panel is used for a front surface of a display element having a pixel density of 300 ppi or more, Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

[2] The touch panel according to [1], in which the optical sheet further satisfies Additional Condition (1) described below, Additional Condition (1); a proportion of inclination angles in a range of 0 degrees to 1.25 degrees in inclination angles of the uneven shape is 20% or less in terms of cumulative percentage.

[3] The touch panel according to [1] or [2], in which the optical sheet further satisfies Additional Condition (2) described below, Additional Condition (2); a proportion of inclination angles of 15 degrees or more in the inclination angles of the uneven shape is 3% or less in terms of cumulative percentage.

[4] A display device including an optical sheet on a front surface of a display element having a pixel density of 300 ppi or more, in which the optical sheet has an uneven shape on a surface, and the uneven shape satisfies at least one condition selected from the following (A) to (C), Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

[5] An optical sheet having an uneven shape on a surface, in which the uneven shape satisfies at least one condition selected from the following (A) to (C), and the optical sheet is used for a front surface of a display element having a pixel density of 300 ppi or more, Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

[6] The optical sheet according to [5], in which the optical sheet further satisfies Additional Condition (1) described below, Additional Condition (1); a proportion of inclination angles in a range of 0 degrees to 1.25 degrees in inclination angles of the uneven shape is 20% or less in terms of cumulative percentage.

[7] The optical sheet according to [5] or [6], in which the optical sheet further satisfies Additional Condition (2) described below, Additional Condition (2); a proportion of inclination angles of 15 degrees or more in the inclination angles of the uneven shape is 3% or less in terms of cumulative percentage.

[8] A method for selecting an optical sheet having an uneven shape on a surface and being used for a front surface of a display element having a pixel density of 300 ppi or more, in which inclination angles of the uneven shape of the optical sheet are measured, and an optical sheet satisfying at least one condition selected from the following (A) to (C) is selected as the optical sheet, Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

[9] A method for manufacturing an optical sheet having an uneven shape on a surface and being used for a front surface of a display element having a pixel density of 300 ppi or more, in which the uneven shape is manufactured so as to satisfy at least one condition selected from the following (A) to (C), Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

The touch panel, display device, and optical sheet of the present invention are capable of imparting a variety of characteristics such as anti-glare properties, and preventing the scintillation of image light in ultrahigh-definition display elements having a pixel density of 300 ppi or more. Particularly, in a case in which the optical sheet is used with the uneven surface facing viewers, it is possible to suppress the reflection of external light even in bright outdoor environments and to impart high-degree anti-glare properties.

In addition, the method for selecting an optical sheet of the present invention is capable of assessing scintillation without incorporating an optical sheet into a display device, and efficiently managing the qualities of optical sheets. In addition, the method for manufacturing an optical sheet of the present invention is capable of imparting a variety of characteristics such as anti-glare properties, and efficiently manufacturing optical sheets capable of preventing the scintillation of image light in ultrahigh-definition display elements having a pixel density of 300 ppi or more.

DETAILED DESCRIPTION OF THE INVENTION

Hereinafter, embodiments of the present invention will be described.

[Touch Panel]

A touch panel of the present invention is a touch panel including an optical sheet as a component, in which the optical sheet has an uneven shape on a surface, the uneven shape satisfies at least one condition selected from the following (A) to (C), and the touch panel is used for a front surface of a display element having a pixel density of 300 ppi or more, Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

Examples of touch panels include electrostatic capacitance-type touch panels, resistance film-type touch panels, optical touch panels, ultrasonic touch panels, electromagnetic induction-type touch panels, and the like. These touch panels include base materials such as glass base materials and plastic film base materials, and, in some cases, have an uneven shape on the surfaces of the base materials to impart a variety of characteristics such as anti-glare properties, adhesion prevention, and interference fringe prevention. In the touch panel of the present invention, an optical sheet described below is used as the base materials having an uneven shape on the surface.

In addition, the optical sheet described below is capable of imparting favorable anti-glare properties even in bright outdoor environments, and also preventing scintillation and a decrease in the resolution. Therefore, the touch panel of the present invention is preferably used with the uneven surface of the optical sheet described below facing an operator (a side opposite to the display element). In recent handheld information terminals represented by smartphones, display elements have ultrahigh definition, and to operate the touch panel outdoors, it is extremely useful to constitute the touch panel of the present invention so that the uneven surface of the optical sheet described below faces an operator.

Figure 1:
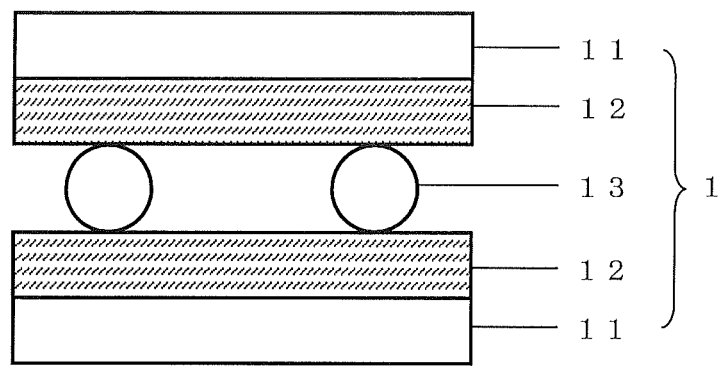
FIG. 1 is a cross-sectional view illustrating an embodiment of a resistance film-type touch panel of the present invention.

As illustrated in FIG. 1, the resistance film-type touch panel 1 has a constitution in which a pair of top and bottom transparent substrates 11 including conductive films 12 are disposed through a spacer 13 so that the conductive films 12 face each other as the basic constitution, and is connected to a circuit which is not illustrated. In the case of the resistance film-type touch panel, the optical sheet described below is preferably used as the upper transparent substrate and/or the lower transparent substrate. The upper transparent substrate and/or the lower transparent substrate may be given a multi-layered structure made up of two or more base materials in which the optical sheet described below is used as one of the base materials.

Regarding the optical sheet in the resistance film-type touch panel, for example, when the optical sheet described below is used as the upper transparent substrate, and the optical sheet is used with the uneven surface facing opposite to the lower transparent substrate, it is possible to impart high-degree anti-glare properties to the resistance film-type touch panel, and prevent scintillation in ultrahigh-definition display elements, and furthermore prevent a decrease in the resolution of ultrahigh-definition display elements. The use of the optical sheet in the above-described manner is preferred since it is possible to make rarely visible damage generated on the surface of the touch panel, the conductive film, and the like, and contribute to the improvement of the yield.

In addition, when the optical sheet described below is used as the lower transparent substrate in the resistance film-type touch panel, and the uneven surface of the optical sheet is set to face the upper transparent substrate, it is possible to suppress reflection on the surface of a lower electrode, and prevent scintillation in ultrahigh-definition display elements. Furthermore, in a case in which the optical sheet is used in the above-described manner, it is possible to prevent the adhesion of the top and bottom conductive films during operation, and prevent the generation of interference fringes caused by the top and bottom conductive films coming close to each other.

In a case in which the optical sheets described below are used as the top transparent substrate and/or the lower transparent substrate so that the uneven surfaces face opposite to an upper electrode, it is possible to prevent adhesion or interference fringes, which is preferred.

Figure 2:
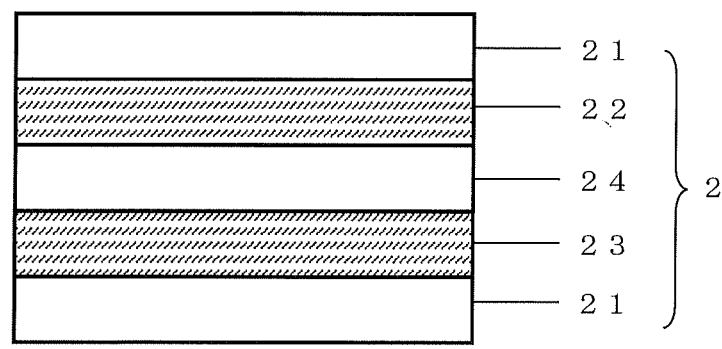
FIG. 2 is a cross-sectional view illustrating an embodiment of an electrostatic capacitance-type touch panel of the present invention.
Figure 3:
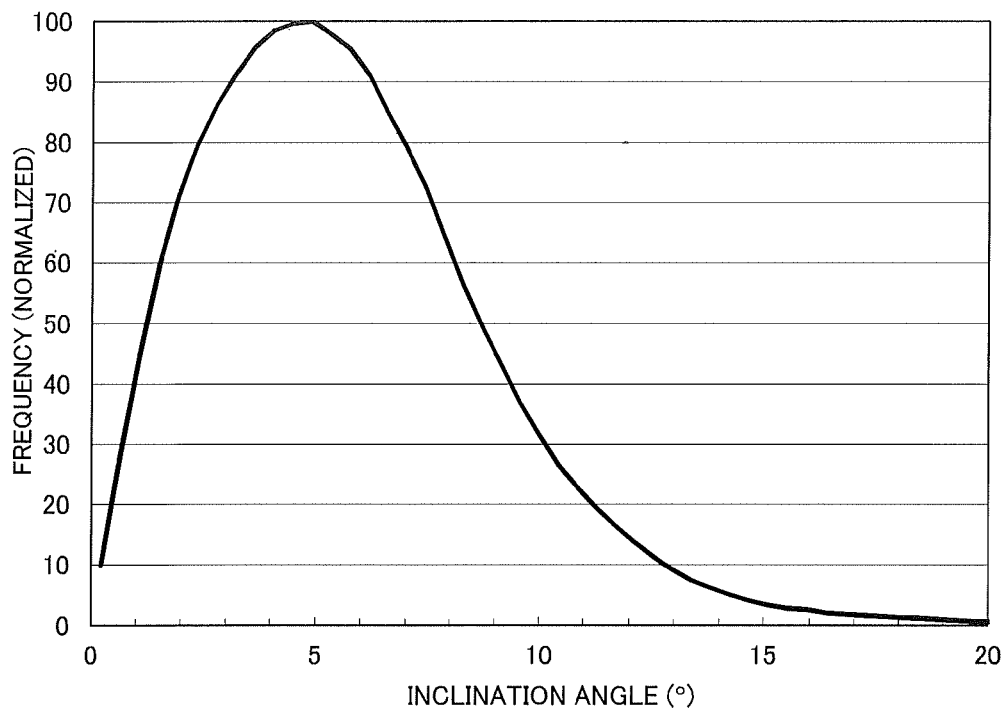
FIG. 3 is a view illustrating an inclination angle distribution curve of an uneven shape of an optical sheet of Example 1.
Figure 4:
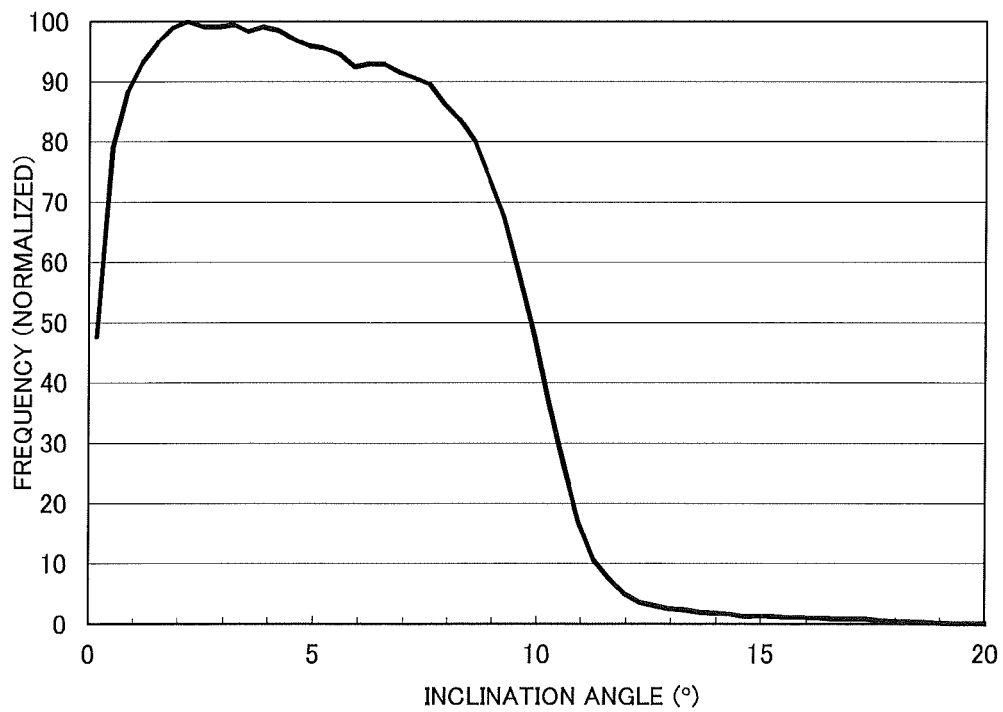
FIG. 4 is a view illustrating the inclination angle distribution curve of an uneven shape of an optical sheet of Example 2.

The electrostatic capacitance-type touch panels are classified into surface electrostatic capacitance-type touch panels, projection electrostatic capacitance-type touch panels, and the like, and projection electrostatic capacitance-type touch panels are widely used. The projection electrostatic capacitance-type touch panel has a basic constitution in which an X-axis electrode and a Y-axis electrode orthogonal to the X electrode are disposed through an insulator, and is connected to a circuit. More specifically described aspects of the basic constitution include an aspect in which the X electrode and the Y electrode are formed on separate surfaces of a transparent substrate, an aspect in which the X electrode, an insulator layer, and the Y electrode are sequentially formed on a transparent substrate, an aspect in which, as illustrated in FIG. 2, an X electrode 22 is formed on a transparent substrate 21, a Y electrode 23 is formed on a separate transparent substrate 21, and both electrodes are laminated through an adhesive layer 24 or the like. Additionally, an aspect in which a separate transparent substrate is laminated on the above-described basic aspect is also included.

In the case of the electrostatic capacitance-type touch panel, the optical sheet described below is preferably used for at least one transparent substrate. The transparent substrate may be given a multi-layered structure made up of two or more base materials in which the optical sheet described below is used as one of the base materials.

In a case in which the electrostatic capacitance-type touch panel has a constitution in which a separate transparent substrate is further provided to the above-described basic aspect, when the optical sheet described below is used as the separate substrate, and the uneven surface of the optical sheet is made to face opposite to the basic aspect so that the uneven surface faces an operator, it is possible to impart high-degree anti-glare properties to the electrostatic capacitance-type touch panel, and prevent scintillation in ultrahigh-definition display elements, and furthermore prevent a decrease in the resolution of ultrahigh-definition display elements. The use of the optical sheet in the above-described manner is preferred since it is possible to make rarely visible damage generated on the surface of the touch panel, the conductive film, and the like.

In addition, in a case in which the electrostatic capacitance-type touch panel has a constitution in which an X electrode is formed on a transparent substrate, a Y electrode is formed on a separate transparent substrate, and both electrodes are laminated through an adhesive layer or the like, when a transparent substrate including the optical sheet described below is used as at least one transparent substrate, and the uneven surface of the optical sheet is made to face opposite to the basic aspect so that the uneven surface faces an operator, it is also possible to obtain the same effects as described above.

In a case in which the optical sheet described below is used as the transparent substrate in the electrostatic capacitance-type touch panel so that the uneven surface faces opposite to an operator, it is possible to prevent adhesion or interference fringes, which is preferred.

(Optical Sheet)

The optical sheet has an uneven shape on the surface, and the uneven shape satisfies at least one condition selected from the following (A) to (C).

Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

The optical sheet may satisfy one condition of Conditions (A) to (C), but preferably satisfies two conditions of (A) to (C), and more preferably satisfies all the conditions (A) to (C).

Condition (A)

Condition (A) requires that the gap between inclination angles indicating the half value (hereinafter, in some cases, referred to as "full width at half maximum") of the peak value of the inclination angle distribution curve of the uneven shape is in a range of 5 degrees to 15 degrees.

In a case in which the full width at half maximum is less than 5 degrees, an uneven shape having inclination angles concentrating in a certain narrow range is formed, and scintillation is likely to occur. In addition, in a case in which the full width at half maximum exceeds 15 degrees, the proportion of steep inclination angles such as inclination angles of more than 15 degrees increases, and thus white muddiness or a decrease in the resolution is likely to be caused, and the contrast is likely to be decreased when the optical sheet is used as an anti-glare sheet.

The full width at half maximum is preferably in a range of 5 degrees to 12 degrees, and more preferably in a range of 6 degrees to 10 degrees.

Condition (B)

Condition (B) requires that the inclination angle (hereinafter, in some cases, referred to as "the inclination angle indicating the inflection point on the positive direction side") indicating an inflection point on the positive direction side of the inclination angle indicating the peak value of the inclination angle distribution curve of the uneven shape is in a range of 4 degrees to 15 degrees, and the difference (hereinafter, in some cases, referred to as "the inclination angle difference between the inflection point and the peak value") between the inclination angle indicating the inflection point on the positive direction side and the inclination angle indicating the peak value of the inclination angle distribution curve is in a range of 2.2 degrees to 10 degrees.

In a case in which the inclination angle indicating the inflection point on the positive direction side is less than 4 degrees, angles concentrate in an angle range of low inclination angles, inclination angles are distributed only in a limited range, scintillation is likely to occur, the number of inclined surfaces having high inclination angles decreases, and it becomes difficult to impart a variety of characteristics such as anti-glare properties. In a case in which the inclination angle indicating the inflection point on the positive direction side exceeds 15 degrees, the proportion of steep inclination angles such as inclination angles of more than 15 degrees increases, and thus white muddiness or a decrease in the resolution is likely to be caused, and the contrast is likely to be decreased when the optical sheet is used as an anti-glare sheet.

In addition, even when the inclination angle indicating the inflection point on the positive direction side is in a range of 4 degrees to 15 degrees, in a case in which the inclination angle difference between the inflection point and the peak value is less than 2.2 degrees, inclination angles concentrate near the peak value, inclination angles are distributed only in a limited range, and scintillation is likely to occur. In addition, even when the inclination angle indicating the inflection point on the positive direction side is in a range of 4 degrees to 15 degrees, in a case in which the inclination angle difference between the inflection point and the peak value exceeds 10 degrees, the tail becomes long in a region of high inclination angles, and thus white muddiness or a decrease in the resolution is likely to be caused, and the contrast is likely to be decreased when the optical sheet is used as an anti-glare sheet.

The inclination angle indicating the inflection point on the positive direction side is preferably in a range of 5 degrees to 12 degrees, more preferably in a range of 5.5 degrees to 10 degrees, and still more preferably in a range of 6 degrees to 8.5 degrees. In addition, the inclination angle difference between the inflection point and the peak value ([the inclination angle indicating the inflection point on the positive direction side]−[the inclination angle indicating the peak value]) is preferably in a range of 2.5 degrees to 9 degrees, more preferably in a range of 2.8 degrees to 8 degrees, and still more preferably in a range of 2.8 degrees to 5 degrees.

Condition (C)

Condition (C) requires that the inclination angle indicating the peak value of the inclination angle distribution curve of the uneven shape is in a range of 2 degrees to 8 degrees, the skewness of the inclination angle distribution curve of the uneven shape is in a range of 0 degrees to 1.5 degrees, and/or the kurtosis of the inclination angle distribution curve of the uneven shape is in a range of 1.5 to 6.

In a case in which the inclination angle (hereinafter, in some cases, referred to as "the inclination angle of the peak value") indicating the peak value of the inclination angle distribution curve of the uneven shape is less than 2 degrees, angles concentrate in an angle range of low inclination angles, inclination angles are distributed only in a limited range, scintillation is likely to occur, the number of inclined surfaces having high inclination angles decreases, and it becomes difficult to impart a variety of characteristics such as anti-glare properties. In a case in which the inclination angle of the peak value exceeds 8 degrees, the proportion of steep inclination angles such as inclination angles of more than 8 degrees increases, and thus white muddiness or a decrease in the resolution is likely to be caused, and the contrast is likely to be decreased when the optical sheet is used as an anti-glare sheet.

In addition, even when the inclination angle of the peak value is in a range of 2 degrees to 8 degrees, in a case in which the skewness (hereinafter, in some cases, referred to as "skewness") of the inclination angle distribution curve of the uneven shape and/or the kurtosis (hereinafter, in some cases, referred to as "kurtosis") of the inclination angle distribution curve of the uneven shape do not satisfy the ranges of the present invention, the distribution of inclination angles does not have an appropriate shape, and scintillation or white muddiness is likely to occur. Therefore, in the present invention, it is required that the skewness is in a range of 0 to 1.5 and/or the kurtosis is in a range of 1.5 to 6 while the inclination angle of the peak value is in a range of 2 degrees to 8 degrees.

When the inclination angle of the peak value is in a range of 2 degrees to 8 degrees, and the skewness of the optical sheet is set in a range of 0 to 1.5, the inclination angle distribution is appropriately biased in a region of low inclination angles, it is possible to facilitate the prevention of adverse effects (white muddiness, a decrease in the resolution, and a decrease in the contrast) caused by inclination angles excessively biased in a region of high inclination angles, and it is possible to facilitate the prevention of adverse effects (the occurrence of scintillation) caused by inclination angles excessively biased in a region of low inclination angles.

When the inclination angle of the peak value is in a range of 2 degrees to 8 degrees, and the kurtosis of the optical sheet is set to 1.5 or more, the tails of the inclination angle distribution become long, and convex portions and concave portions have a variety of inclination angles, and thus it is possible to facilitate the prevention of scintillation. In addition, when the inclination angle of the peak value is in a range of 2 degrees to 8 degrees, and the kurtosis of the optical sheet is set to 6 or less, the concentration of angles in an extremely narrow range near the peak value is prevented, and it is possible to facilitate the prevention of scintillation. Furthermore, when the inclination angle of the peak value is in a range of 2 degrees to 8 degrees, and the kurtosis of the optical sheet is set to 6 or less, the tail on the flat angle (angles below the peak value) side is shortened, which improves the anti-glare properties, and the tail on the steep angle (angles above the peak value) side is shortened, which facilitates the prevention of white muddiness, a decrease in the resolution, and a decrease in the contrast.

The inclination angle of the peak value is preferably in a range of 2.1 degrees to 7 degrees, and more preferably in a range of 2.1 degrees to 6 degrees.

The skewness of the optical sheet is preferably in a range of 0 to 1.4, and more preferably in a range of 0 to 1.2.

The kurtosis of the optical sheet is preferably in a range of 2 to 6, and more preferably in a range of 2.5 to 6.

The inclination angle distribution curve in the present invention is an approximated curve obtained through the linear interpolation of the values of individual sections of the histogram of the inclination angle distribution. In addition, the values (frequencies) of the individual sections are assigned to the positions of the central angles of the individual sections of the histogram. For example, in a case in which a certain section of the histogram is set in a range of X degrees to Y degrees, the value (frequency) of the section is assigned to the position of (X+Y)/2 degrees. In addition, in the histogram from which the inclination angle distribution curve is derived, the widths of the sections are preferably set to be sufficiently narrow in order to precisely reflect the distribution status of the inclination angles. When the widths of the sections are 0.5 degrees or less, it is possible to precisely reflect the distribution status of the inclination angles. Meanwhile, in a case in which the widths of the sections are too narrow, the influence of noise becomes significant. Therefore, the widths of the sections are preferably set in a range of 0.1 degrees to 0.5 degrees. For example, in Example 1 described below, the widths of the sections are set to 0.425 degrees.

In the related art, in order to prevent scintillation, inclination angles were designed to be small so as to mitigate the degree of unevenness; however, in the present invention, conversely, convex portions and concave portions having high inclination angles are provided, thereby preventing scintillation. That is, the fact that any of Conditions (A) to (C) are satisfied indicates the presence of convex portions and concave portions having high inclination angles, the presence of a variety of inclination angles, and furthermore, a small proportion of almost flat regions. The optical sheet used in the touch panel of the present invention is considered to be capable of preventing scintillation since the optical sheet has an uneven shape in which inclined surfaces having high inclination angles are provided, a variety of inclination angles exist, and furthermore, the proportion of almost flat regions is small. (Precisely, even in the present invention, it is considered that scintillation occurs to some extent. However, it is considered that, in the present invention, the proportion of boundaries between uneven places and substantially smooth places on the surface of the optical sheet is decreased, or a variety of inclination angles are provided, whereby scintillation is averaged, and is made invisible.)

In addition, in the optical sheet used in the touch panel of the present invention, it is possible to improve the scintillation-preventing properties using the uneven shape, and thus it is not necessary to increase the internal haze more than necessary, and it is possible to prevent a decrease in the resolution of ultrahigh-definition display elements. In addition, since the uneven shape includes a small proportion of almost flat regions and has a variety of inclination angles, it is possible to impart high-degree anti-glare properties. In an optical sheet of the related art, scintillation is prevented by mitigating the degree of unevenness, and flat sections are present between particles forming convex portions and concave portions, and thus the shape is significantly different from that of the optical sheet of the present invention.

The touch panel of the present invention is capable of further improving scintillation-preventing properties while imparting a variety of characteristics such as anti-glare properties. Particularly, when the optical sheet is disposed on the operator side of the touch panel so as to be used as an anti-glare sheet, it becomes easy to impart anti-glare properties while a decrease in the contrast is suppressed, which is preferable. That is, the optical sheet used in the present invention has a specific uneven shape suppressing reflection in the specular direction so as to impart anti-glare properties favorable enough to endure bright outdoor environments, and furthermore, suppresses the angles of diffusion and reflection excessively widening, whereby it is also possible to prevent a decrease in the contrast. In addition, it is possible to prevent a decrease in the resolution of ultrahigh-definition display elements by suppressing the angles of diffusion and reflection excessively widening.

The uneven shape of the optical sheet is preferably a shape that gradually decreases in both positive and negative directions from the peak value of the inclination angle distribution curve. An optical sheet having the above-described shape has the inclination angle indicating the half value of the peak value of the inclination angle distribution curve of the uneven shape at two points, and thus the gap between the two points becomes the full width at half maximum. In a case in which the inclination angle distribution curve of the uneven shape of the optical sheet has a shape that, first, gradually decreases from the peak value, then, increases, and again, gradually decreases, there are cases in which the inclination angles indicating the half of the peak value of the inclination angle distribution curve appear at more than two points. In this case, the gap between the first angle in the positive direction from the peak value, which indicates the half value, and the first angle in the negative direction from the peak value, which indicates the half value, is considered as the full width at half maximum.

Figure 5:
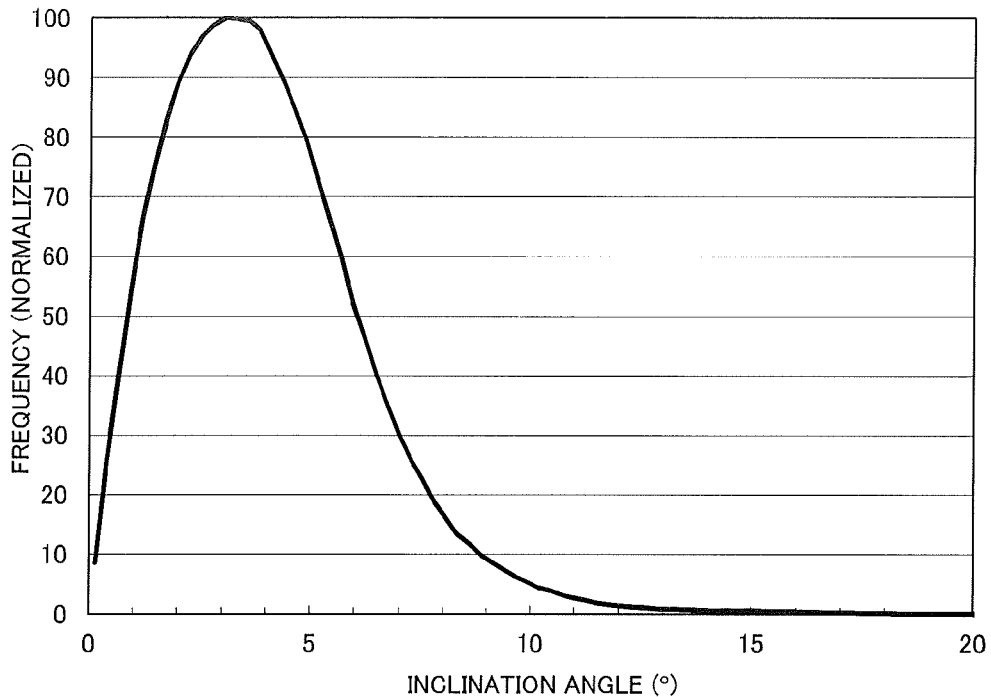
FIG. 5 is a view illustrating the inclination angle distribution curve of an uneven shape of an optical sheet of Example 3.
Figure 6:
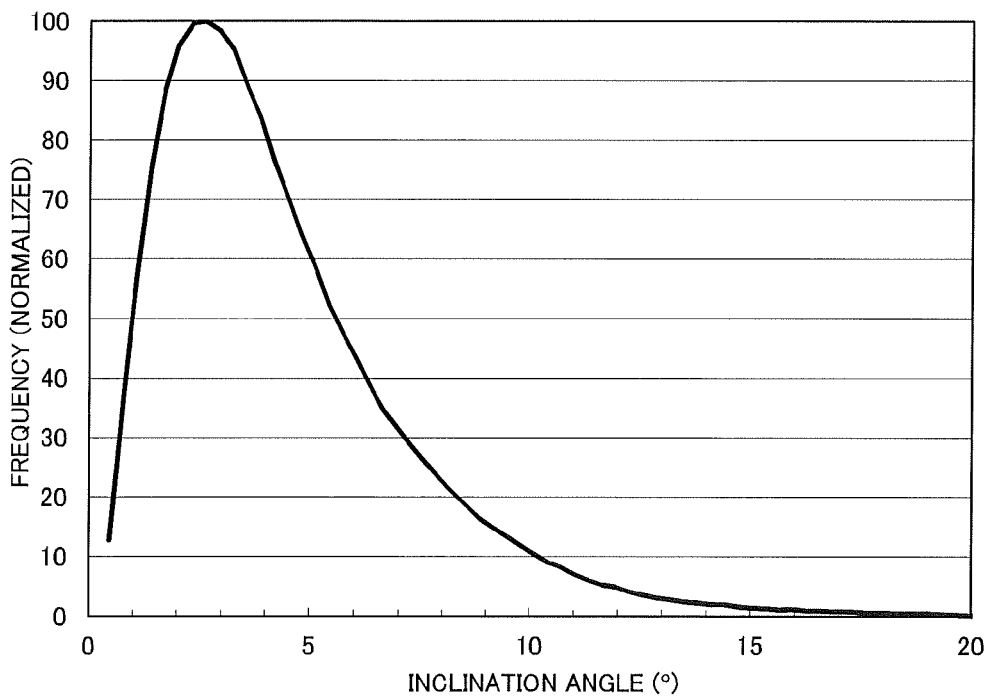
FIG. 6 is a view illustrating the inclination angle distribution curve of an uneven shape of an optical sheet of Comparative Example 1.
Figure 7:
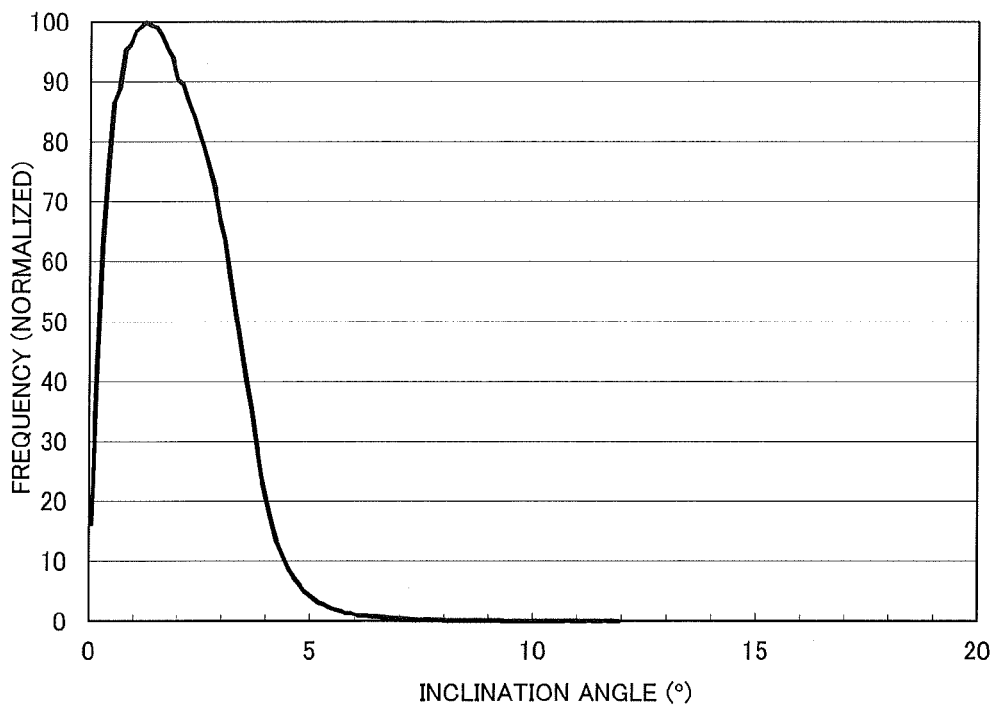
FIG. 7 is a view illustrating the inclination angle distribution curve of an uneven shape of an optical sheet of Comparative Example 2.
Figure 8:
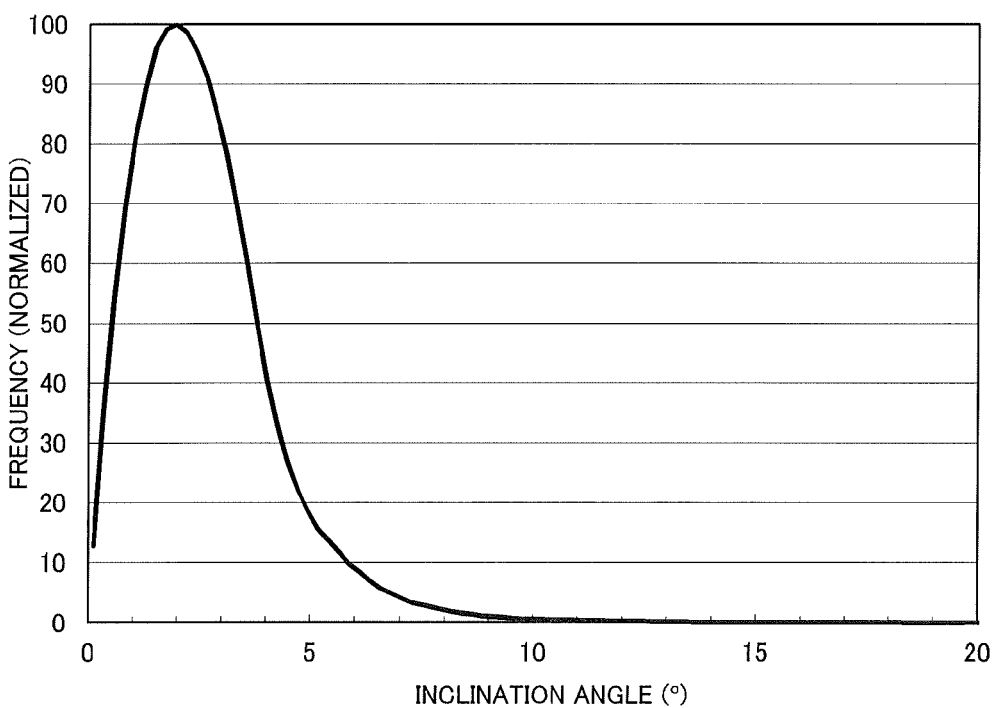
FIG. 8 is a view illustrating the inclination angle distribution curve of an uneven shape of an optical sheet of Comparative Example 3.
Figure 9:
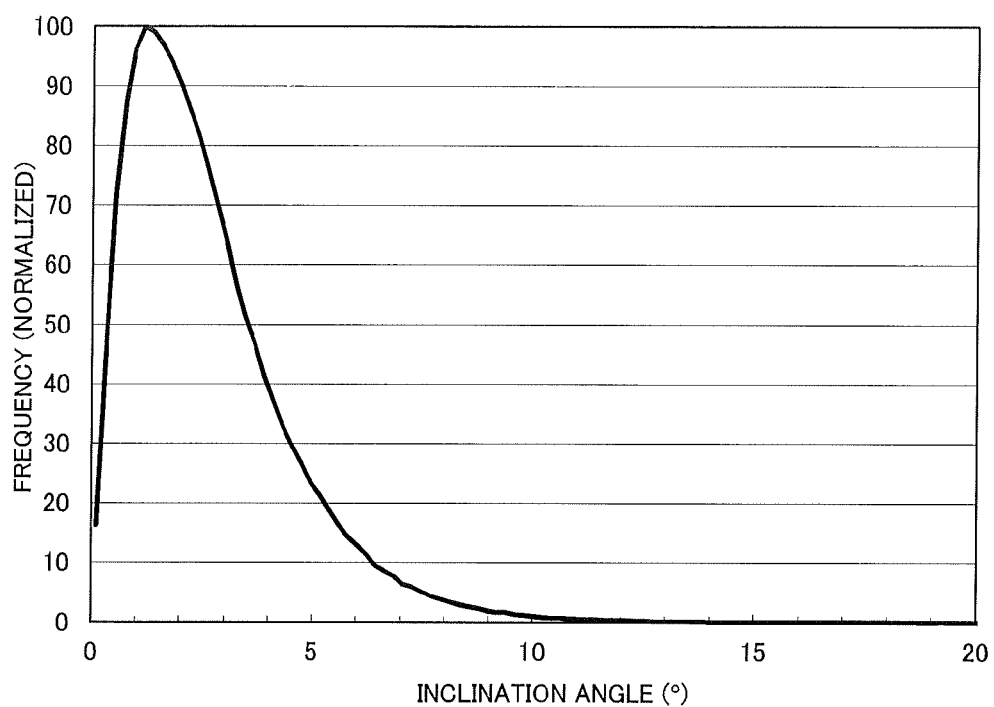
FIG. 9 is a view illustrating the inclination angle distribution curve of an uneven shape of an optical sheet of Comparative Example 4.

FIGS. 3 to 9 are views of the inclination angle distribution curves of the uneven shapes of optical sheets of Examples 1 to 3 and Comparative Examples 1 to 4 in which the respective peak values are regulated at 100. The gaps between the inclination angles at which the frequency reaches 50 in FIGS. 3 to 9 correspond to the full widths at half maximum of the optical sheets of Examples 1 to 3 and Comparative Examples 1 to 4. For example, the full width at half maximum of the optical sheet of Example 3 in FIG. 5 is 5.2 degrees which is the gap between the inclination angles (0.9 degrees and 6.1 degrees) at which the frequency is 50.

The inclination angle distribution of the uneven shape of the optical sheet can be calculated from a three-dimensional roughness curve obtained from the measurement using a contact-type surface roughness meter or a non-contact-type surface roughness meter (for example, an interference microscope, a confocal microscope, an atomic force microscope, or the like). Data in the three-dimensional roughness curve is indicated using points disposed in a lattice shape at intervals d on a reference plane (the traverse direction is set as the x axis, and the vertical direction is set as the y axis) and heights at the positions of the points. When the height at the position of the point of $i^{th}$ in the x-axis direction and $j^{th}$ in the y-axis direction (hereinafter, will be expressed as (i, j)) is expressed as $Z_{i,j}$, at an arbitrary position (i, j), the inclination Sx of the x-axis direction with respect to the x axis and the inclination Sy of the y-axis direction with respect to the y axis are calculated as described below.

$$Sx=(Z_{i+1,j}-Z_{i-1,j})/2d$$

$$Sy=(Z_{i,j+1}-Z_{i,j-1})/2d$$

Furthermore, the inclination St with respect to the reference plane at (i, j) is calculated using Equation (1) described below.

$$St=\sqrt{Sx^2+Sy^2} \qquad (1)$$

In addition, the inclination angle at (i, j) is calculated using $\tan^{-1}(St)$. The above-described calculation is carried out for the respective points, thereby calculating the inclination angle distribution of the three-dimensional roughness curve. It is possible to prepare the inclination angle distribution curve from the histogram of the calculated inclination angle distribution data using the above-described method, and calculate the inclination angles indicating the above-described full width at half maximum and peak value.

The above-described inflection point, skewness, and kurtosis, and a three-dimensional average inclination angle described below can be calculated using a method described in examples.

The three-dimensional roughness curve is preferably measured using an interference microscope in terms of convenience. Examples of the interference microscope include "New View" series manufactured by Zygo Corporation and the like.

Additional Conditions

In the optical sheet, the proportion of inclination angles of 0 degrees to 5 degrees in the inclination angles of the uneven shape is preferably in a range of 40% to 80%, and more preferably in a range of 45% to 75% in terms of cumulative percentage. When the proportion is set to 40% or more, it is possible to prevent white muddiness or a decrease in the contrast by decreasing the proportion of convex portions and concave portions having inclination angles of more than 5 degrees. In addition, when the proportion is set to 80% or less, it is possible to further facilitate the prevention of scintillation, and it is possible to impart anti-glare properties favorable enough to endure bright outdoor environments.

Additional Condition (1)

The optical sheet preferably satisfies Additional Condition (1) described below from the viewpoint of further improving the anti-glare properties.

Additional Condition (1); the proportion of inclination angles in a range of 0 degrees to 1.25 degrees in the inclination angles of the uneven shape is 20% or less in terms of cumulative percentage.

The cumulative percentage of Additional Condition (1) is more preferably 15% or less, and still more preferably 12% or less.

Additional Condition (2)

The optical sheet preferably satisfies Additional Condition (2) described below.

Additional Condition (2); the proportion of inclination angles of more than 15 degrees in the inclination angles of the uneven shape is 3% or less in terms of cumulative percentage.

When Additional Condition (2) is satisfied, it is possible to facilitate the prevention of white muddiness, a decrease in the resolution, and a decrease in the contrast. The cumulative percentage of Additional Condition (2) is more preferably 2% or less, and still more preferably 1.5% or less.

In the optical sheet, the three-dimensional average inclination angle ($\theta a_{3D}$) of the uneven shape is preferably in a range of 3.0 degrees to 9.0 degrees, more preferably in a range of 4.0 degrees to 8.0 degrees, and still more preferably in a range of 4.5 degrees to 7.0 degrees. When $\theta a_{3D}$ is set to 3.0 degrees or more, it is possible to facilitate the imparting of a variety of characteristics such as anti-glare properties. In addition, when $\theta a_{3D}$ is set to 9.0 degrees or less, it is possible to facilitate the prevention of white muddiness, a decrease in the resolution, and a decrease in the contrast.

Additional Condition (3)

The above-described conditions (A) and/or (B) preferably further satisfy Additional Condition (3) described below.

Additional Condition (3); the inclination angle indicating the peak value of the inclination angle distribution curve is in a range of 2 degrees to 8 degrees.

When the inclination angle of Additional Condition (3) is set to 2 degrees or more, it is possible to facilitate the prevention of scintillation while imparting a variety of characteristics such as anti-glare properties. In addition, when the inclination angle is set to 8 degrees or less, it is possible to facilitate the prevention of white muddiness, a decrease in the resolution, and a decrease in the contrast.

The inclination angle of Additional Condition (3) is preferably in a range of 2.1 degrees to 7 degrees, and more preferably in a range of 2.1 degrees to 6 degrees.

Additional Condition (4)

The above-described conditions (A) and/or (B) preferably further satisfy Additional Condition (4) described below.

Additional Condition (4); the skewness of the inclination angle distribution of the uneven shape is in a range of 0 to 1.5.

When the skewness of Additional Condition (4) is set in a range of 0 to 1.5, the inclination angle distribution is appropriately biased in a region of low inclination angles, it is possible to facilitate the prevention of adverse effects (white muddiness, a decrease in the resolution, and a decrease in the contrast) caused by inclination angles excessively biased in a region of high inclination angles, and it is possible to facilitate the prevention of adverse effects (the occurrence of scintillation) caused by inclination angles excessively biased in a region of low inclination angles.

The skewness of Additional Condition (4) is preferably in a range of 0 to 1.4, and more preferably in a range of 0 to 1.2.

Additional Condition (5)

The above-described conditions (A) and/or (B) preferably further satisfy Additional Condition (5) described below.

Additional Condition (5); the kurtosis of the inclination angle distribution of the uneven shape is in a range of 1.5 to 6.

When the kurtosis of Additional Condition (5) is set to 1.5 or more, the tails of the inclination angle distribution become long, and convex portions and concave portions have a variety of inclination angles, and thus it is possible to facilitate the prevention of scintillation. In addition, when the kurtosis of Additional Condition (5) is set to 6 or less, the concentration of angles in an extremely narrow range near the peak value is prevented, it is possible to facilitate the prevention of scintillation, the tail on the flat angle (angles below the peak value) side is shortened, which improves the anti-glare properties, and the tail on the steep angle (angles above the peak value) side is shortened, which facilitates the prevention of white muddiness, a decrease in the resolution, and a decrease in the contrast.

The kurtosis of Additional Condition (5) is preferably in a range of 2 to 6, and more preferably in a range of 2.5 to 6.

Additional Condition (6)

The above-described conditions (A) and/or (C) preferably further satisfy Additional Condition (6) described below.

Additional Condition (6); the inclination angle (the inclination angle indicating the inflection point on the positive direction side) indicating the inflection point on the positive direction side of the inclination angle indicating the peak value of the inclination angle distribution curve is in a range of 4 degrees to 15 degrees.

The fact that the inclination angle of Additional Condition (6) is 4.0 degrees or more means that, on the uneven surface, inclination angles do not concentrate in a region of low inclination angles, and there are a variety of inclination angles. It is considered that, when inclination does not concentrate in a region of low inclination angles, and there are a variety of inclination angles, it is possible to further prevent scintillation. In addition, when the inclination angle of Additional Condition (6) is set to 4 degrees or more, it is possible to facilitate the improvement of a variety of characteristics such as anti-glare properties due to the presence of inclination having high inclination angles. In addition, when the inclination angle is set to 15 degrees or less, it is possible to facilitate the prevention of white muddiness, a decrease in the resolution, and a decrease in the contrast.

The inclination angle of Additional Condition (6) is preferably in a range of 5 degrees to 12 degrees, more preferably in a range of 5.5 degrees to 10 degrees, and still more preferably in a range of 6 degrees to 8.5 degrees.

Additional Condition (7)

The above-described conditions (A) and/or (C) preferably further satisfy Additional Condition (7) described below.

Additional Condition (7); the difference between the inclination angle indicating the inflection point and the inclination angle indicating the peak value ([the inclination angle indicating the inflection point on the positive direction side]−[the inclination angle indicating the peak value]) is in a range of 2.2 degrees to 10 degrees.

When Additional Condition (7) is satisfied, it is possible to further improve the effects of Additional Conditions (6).

The inclination angle difference of Additional Condition (7) is more preferably in a range of 2.5 degrees to 9 degrees, still more preferably in a range of 2.8 degrees to 8 degrees, and far still more preferably in a range of 2.8 degrees to 5 degrees.

In the optical sheet, the total light transmittance (JIS K7361-1:1997) is preferably 80% or more, more preferably 85% or more, and still more preferably 90% or more.

In the optical sheet, the haze (JIS K7136:2000) is preferably in a range of 25% to 60%, more preferably in a range of 30% to 60%, and still more preferably in a range of 30% to 50%. When the haze is set to 25% or more, it is possible to impart anti-glare properties, and make the shape or damage of electrodes rarely visible. In addition, when the haze is set to 60% or less, it is possible to prevent a decrease in the resolution of ultrafine-definition display elements, and prevent a decrease in the contrast.

In a case in which the haze is classified into the surface haze (Hs) and the internal haze (Hi), the surface haze is preferably in a range of 20% to 50%, more preferably in a range of 20% to 45%, and still more preferably in a range of 25% to 40%. When the surface haze is set to 20% or more, it is possible to improve anti-glare properties even in bright outdoor operation environments, and make the shape or damage of electrodes rarely visible, and when the haze is set to 50% or less, it is possible to facilitate the prevention of a decrease in the contrast or a decrease in the resolution.

In addition, the internal haze is preferably in a range of 5% to 30%, more preferably in a range of 5% to 25%, and still more preferably in a range of 10% to 18%. When the internal haze is set to 5% or more, it is possible to facilitate the prevention of scintillation due to the synergetic actions with the surface unevenness, and when the internal haze is set to 30% or less, it is possible to prevent a decrease in the resolution of ultrahigh-definition display elements.

In addition, from the viewpoint of the balance in the above-described effects of the surface haze and the internal haze, the ratio (Hs/Hi) of the surface haze to the internal haze is preferably in a range of 1.0 to 5.0, more preferably in a range of 2.0 to 5.0, and still more preferably in a range of 2.5 to 4.5.

The surface haze and the internal haze can be obtained using, for example, methods described in the examples.

In the optical sheet, from the viewpoint of the resolution and the viewpoint of the shape or damage of electrodes made rarely visible, the sum of four transmitted image clarities that have passed through optical combs including 2 mm, 1 mm, 0.5 mm, and 0.125 mm width, which are obtained using an image clarity meter determined by JIS K7105:1981, is preferably 100% or less, and more preferably in a range of more than 20% to 80%.

The arithmetic average roughness Ra of the uneven shape of the optical sheet is preferably in a range of 0.20 μM to 0.70 μm, and more preferably in a range of 0.25 μm to 0.50 μm. When Ra is set to 0.20 μm or more, it is possible to facilitate the prevention of scintillation, and improve anti-glare properties, adhesion prevention properties, and interference fringe prevention properties, and furthermore, it is possible to make the shape or damage of electrode rarely visible. In addition, when Ra is set to 0.70 μm or less, it is possible to prevent a decrease in the resolution and the contrast. For Ra, and Rz and Smp described below, the cut-off value is set to 0.8 mm.

In the present invention, Ra is a three-dimensionally expanded value of Ra which is a two-dimensional roughness parameter described in JIS B0601:1994, and is calculated by drawing orthogonal coordinate axes X and Y on the reference plane, and using Equation (2) described below in which the roughness curve is represented by $Z(x,y)$, and the size of the reference plane is represented by Lx and Ly.

$$Ra = \frac{1}{A} \int_0^{Lx} \int_0^{Ly} |Z(x, y)| \, dx \, dy \qquad (2)$$

$$A = Lx \times Ly$$

In addition, when the above-described $Z_{i,j}$ is used, Ra is calculated using Equation (3) described below.

$$Ra = \frac{1}{N} \sum_{i,j}^{N} |Z_{i,j}| \qquad (3)$$

N: total number of points

The ten point height of irregularities Rz of the uneven shape of the optical sheet is preferably in a range of 1.00 μM to 3.50 μm, and is more preferably in a range of 1.20 μm to 3.00 μm. When Rz is set to 1.00 μm or more, it is possible to facilitate the prevention of scintillation, and improve anti-glare properties, adhesion prevention properties, and interference fringe prevention properties, and furthermore, it is possible to make the shape or damage of electrode rarely visible. In addition, when Rz is set to 3.50 μm or less, there are no extremely tall convex portions, and thus it is possible to facilitate the prevention of a decrease in the resolution and the contrast.

From the viewpoint of further facilitating the obtainment of the above-described effects of Ra and Rz, the ratio [Rz/Ra] of Rz to Ra is preferably 6.0 or less, more preferably in a range of 4.0 to 6.0, and still more preferably in a range of 4.5 to 5.7.

In the present invention, Rz is a three-dimensionally expanded value of Rz which is a two-dimensional roughness parameter described in JIS B0601:1994. A number of straight lines passing though the center of the reference plane are drawn radially 360 degrees on the reference plane so as to fully cover the entire area, a cross-sectional curve is obtained by cutting the three-dimensional roughness curve on the basis of the respective straight lines, and the ten point height of irregularities (the sum of the average of the heights of the five tallest crests and the average of the depths of the five deepest troughs) in the cross-sectional curve is obtained. Out of a number of the ten point heights of irregularities obtained in the above-described manner, the top 50% values are averaged, thereby calculating Rz.

The average peak-to-peak gap Smp of convex portions and concave portions of the uneven shape of the optical sheet is preferably in a range of 25 μm to 100 μm, more preferably in a range of 30 μm to 80 μm, and still more preferably in a range of 30 μm to 70 μm. When the full width at half maximum of the inclination angle distribution curve is set in the range of the present invention, and then Smp is set in the above-described range, it is possible to obtain an uneven shape that is neither too shallow nor too steep, and facilitate the prevention of scintillation, and it is possible to facilitate the exhibition of a variety of performances such as anti-glare properties, the prevention of adhesion, the prevention of interference fringes, the shape or damage of electrode made visible, the prevention of a decrease in the resolution, and the prevention of white muddiness.

Smp is obtained as described below. When a portion of the three-dimensional roughness curve which is higher than the reference plane and is surrounded by a single region is defined as a mountain, the number of mounts is represented by Ps, and the area of the entire measurement region (reference plane) is represented by A, whereby Smp is calculated using Equation (4) described below.

$$Smp = \sqrt{\frac{A}{Ps}} \quad (4)$$

Ra, Rz, and Smp can be calculated using a measurement and analysis application "MetroPro" affiliated to the above-described interference microscope "New View" series.

As the above-described optical sheet, any optical sheets can be used without any particular limitation as long as the optical sheets have the above-described uneven shape on at least one surface, and transparency. In addition, the optical sheet may have the above-described uneven shape on both surfaces; however, from the viewpoint of handling properties and image visibility (resolution and white muddiness), the optical sheet preferably has the above-described uneven shape on one surface, and has the other surface that is substantially smooth (Ra of 0.02 μm or less).

In addition, the optical sheet may be a single uneven layer, or a multi-tiered layer including an uneven layer on a transparent base material. A structure in which an uneven layer is provided on a transparent base material is preferred in consideration of handling properties and ease of manufacturing.

Examples of a method for forming convex portions and concave portions include 1) a method in which an emboss roll is used, 2) an etching treatment, 3) casting using a mold, 4) the formation of a coated film through coating, and the like. Among the above-described methods, 3) casting using a mold is preferred from the viewpoint of the reproducibility of the uneven shape, and 4) the formation of a coated film through coating is preferred from the viewpoint of productivity and versatility.

In the casting using a mold, convex portions and concave portions can be manufactured by producing a mold having a complementary shape with the uneven surface, injecting a material constituting the uneven layer such as a macromolecular resin or glass into the mold, curing the material, and then removing the material from the mold. In a case in which a transparent base material is used, convex portions and concave portions can be manufactured by injecting a macromolecular resin or the like into a mold, overlaying the transparent base material on the macromolecular resin or the like, curing the macromolecular resin or the like, and removing the macromolecular resin or the like together with the transparent base material from the mold.

In the formation of a coated film through coating, a coated film can be formed by applying a coating fluid for forming an uneven layer, which includes a resin component and transmissive particles, to a transparent base material using a well-known application method such as gravure coating or bar coating, and drying and curing the coating fluid as necessary. In order to obtain an uneven shape in the above-described range, inorganic ultrafine particles are preferably added to the coating fluid for forming an uneven layer.

Figure 10:
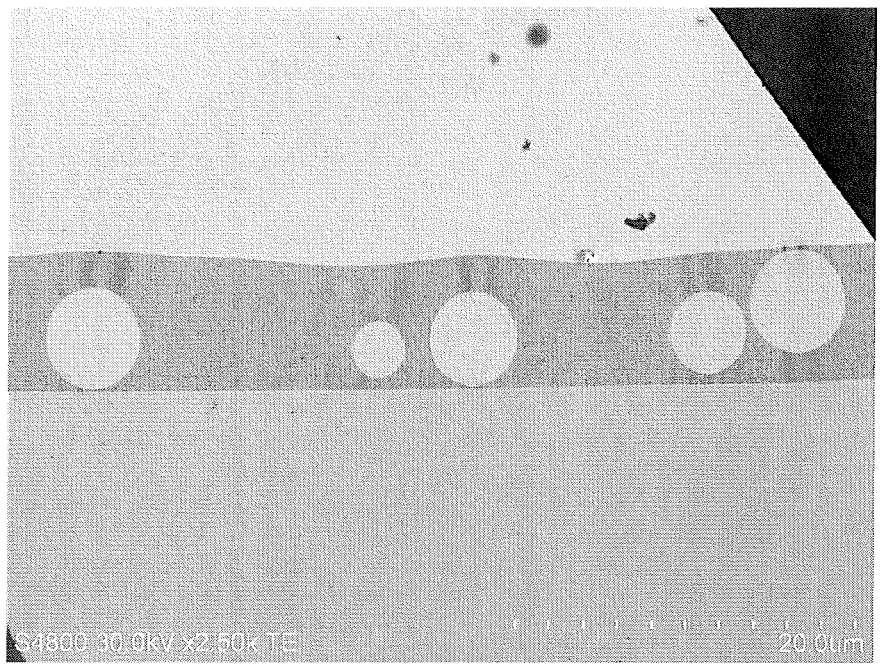
FIG. 10 is a scanning transmission electron microscopic photograph (STEM) illustrating a cross-section of the optical sheet of Example 1.

FIG. 10 is a scanning transmission electron microscopic photograph (STEM) illustrating a cross-section of an uneven layer of an optical sheet of Example 1 which is formed by applying a coating fluid for forming an uneven layer including a binder resin, transmissive particles, and inorganic ultrafine particles.

Generally, the surface of the uneven layer become substantially smooth in places in which transmissive particles are absent; however, in the uneven layer of FIG. 10, places in which transmissive particles are absent also have slight inclination. This is considered to be because the thixotropic nature of the coating fluid and the drying characteristics of a solvent are affected by the inorganic ultrafine particles, and thus the surface is not levelled as much as ordinary cases. As described above, it is considered that, when slight inclination is formed even in places in which transmissive particles are absent, substantially smooth places are rarely present on the uneven layer, and it becomes easy to set Conditions (A) to (C) and other additional conditions in the ranges of the present invention.

It is considered that, in the uneven layer in FIG. 10, for the following reasons (1) to (3), it is possible to facilitate the setting Conditions (A) to (C) and other additional conditions in the above-described ranges.

(1) Slightly steep inclination and slight inclination respectively coexist in places in which transmissive particles are present and places in which transmissive particles are absent, and an uneven shape having random inclination is formed.

(2) Generally, the shape of the uneven layer on the periphery of transmissive particles present near the surface of the uneven layer has a number of convex portions in accordance with the shapes of the transmissive particles; however, in the uneven layer of FIG. 10, the shape does not have a number of convex portions in accordance with the shapes of the transmissive particles. As described above, since the shapes of the transmissive particles present near the surface of the uneven layer are not sufficiently reflected in the surface shape of the uneven layer, a shape having a small number of steep convex portions and concave portions is formed.

(3) In the uneven layer of FIG. 10, transmissive particles are both dispersed and agglomerated. This is considered to be because inorganic ultrafine particles have an influence on the thixotropic nature of the coating fluid and the affinity of transmissive particles. As described above, since transmissive particles are both dispersed and agglomerated, a random surface shape having significant variation in the uneven shape is formed.

As the transmissive particle, it is possible to use any of organic transmissive particles and inorganic transmissive particles. The transmissive particles can have shapes such as a spherical shape, a disc shape, a rugby ball shape, and irregular shapes, and can be hollow particles, porous particles, solid particles, and the like in the above-described shapes. Among them, spherical solid particles are preferred from the viewpoint of the prevention of scintillation.

Examples of the organic transmissive particles include particles made of polymethyl methacrylate, polyacryl-styrene copolymers, melamine resin, polycarbonate, polystyrene, polyvinyl chloride, benzoguanamine-melamine-formaldehyde condensates, silicone, fluorine-based resins, polyester-based resins, and the like.

Examples of the inorganic transmissive particles include particles made of silica, alumina, zirconia, titania, and the like.

Among the above-described transmissive particles, the organic transmissive particles are preferred from the viewpoint of dispersion control, and among the organic transmissive particles, polyacryl-styrene copolymer particles are preferred. Polyacryl-styrene copolymer particles are preferred since it is easy to control the refractive index and the degree of hydrophobicity, and thus it is easy to control the internal haze and agglomeration/dispersion.

From the viewpoint of facilitating the obtainment of the above-described uneven shape, the average particle diameter of the transmissive particles is preferably in a range of 2 μm to 10 μm, and more preferably in a range of 3 μm to 8 μm.

In addition, the ratio (the average particle diameter of the transmissive particles/the thickness of the uneven layer) of the average particle diameter of the transmissive particles to the thickness of the uneven layer is preferably in a range of 0.5 to 1.0, and more preferably in a range of 0.6 to 0.9 from the viewpoint of facilitating the obtainment of the above-described uneven shape.

The average particle diameter of the transmissive particles can be calculated through the following tasks (1) to (3).

(1) A transmission observation image of the optical sheet of the present invention is captured using an optical microscope. The magnification is preferably in a range of 500 times to 2000 times.

(2) 10 arbitrary particles are selected from the observation image, the long diameters and short diameters of the respective particles are measured, and the particle diameters of the respective particles are calculated from the averages of the long diameters and short diameters. The longest diameter of each particle on the screen is considered as the long diameter. Regarding the short diameter, when a line segment orthogonally intersecting the center point of a line segment constituting the long diameter is drawn, the distance between two points at which the orthogonally intersecting line segment intersects a particle is considered as the short diameter.

(3) The same tasks are carried out on five more observation images of the same sample on different screens, and a value obtained from the number average of a total of 50 particle diameters is considered as the average particle diameter of the transmissive particles.

The average primary particle diameter of the inorganic ultrafine particles can be calculated by, first, capturing a cross-section of the optical sheet of the present invention using a TEM or STEM, and then carrying out the same method as in (2) and (3). The acceleration voltage of the TEM or STEM is preferably set in a range of 10 kV to 30 kV, and the magnification is preferably set in a range of 50000 times to 300000 times.

From the viewpoint of facilitating the obtainment of the above-described uneven shape, the content of the transmissive particles is preferably in a range of 2% by mass to 25% by mass, and more preferably in a range of 5% by mass to 20% by mass in all the solid content forming the uneven layer.

Examples of the inorganic ultrafine particles include ultrafine particles made of silica, alumina, zirconia, titania, and the like. Among them, silica ultrafine particles are preferred from the viewpoint of transparency.

From the viewpoint of facilitating the obtainment of the above-described uneven shape, the average primary particle diameter of the inorganic ultrafine particles is preferably in a range of 1 nm to 25 nm, and more preferably in a range of 5 nm to 20 nm.

The inorganic ultrafine particles are preferably inorganic reactive ultrafine particles into which a reactive group is introduced through a surface treatment. When a reactive group is introduced, it becomes possible to include a large amount of the inorganic ultrafine particles in the uneven layer, and it is possible to facilitate the obtainment of the above-described uneven shape.

As the reactive group, a polymerizable unsaturated group is preferably used, and the reactive group is preferably a photocurable unsaturated group, and particularly preferably an ionizing radiation-curable unsaturated group. Specific examples thereof include ethylenic unsaturated bonds such as (meth)acryloyl groups, (meth)acryloyloxy groups, vinyl groups, and allyl groups, epoxy groups, and the like.

Examples of the inorganic reactive ultrafine particles include inorganic ultrafine particles having surfaces treated using a silane coupling agent. Examples of a method for treating the surfaces of inorganic ultrafine particles using a silane coupling agent include a dry method in which a silane coupling agent is sprayed to inorganic ultrafine particles, a wet method in which a silane coupling agent is added while inorganic ultrafine particles are dispersed, and the silane coupling agent and the inorganic ultrafine particles are reacted to each other, and the like.

The content of the inorganic ultrafine particles is preferably in a range of 10% by mass to 90% by mass, more preferably in a range of 20% by mass to 70% by mass, and still more preferably in a range of 35% by mass to 50% by mass in all the solid content forming the uneven layer. When the content of the inorganic ultrafine particles is set in the above-described range, it is possible to facilitate the obtainment of the above-described uneven shape by controlling levelling properties and suppressing the polymerization shrinkage of the uneven layer.

From the viewpoint of facilitating the obtainment of the above-described uneven shape, the ratio (the content of the transmissive particles/the content of the inorganic ultrafine particles) between the transmissive particles and the inorganic ultrafine particles in the uneven layer is preferably in a range of 0.1 to 0.4, and more preferably in a range of 0.2 to 0.3.

The resin component of the uneven layer preferably includes a thermosetting resin composition or an ionizing radiation-curable resin composition. From the viewpoint of further improving mechanical strength, the resin component more preferably includes an ionizing radiation-curable resin composition, and, among the ionizing radiation-curable resin compositions, still more preferably includes an ultraviolet-curable resin composition.

The thermosetting resin composition is a composition which includes at least a thermosetting resin and is cured through heating.

Examples of the thermosetting resin include acryl resins, urethane resins, phenol resins, urea melamine resins, epoxy resins, unsaturated polyester resins, silicone resins, and the like. A curing agent is added to the thermosetting resin as necessary.

The ionizing radiation-curable resin composition is a composition including a compound (hereinafter, also referred to as "ionizing radiation-curable compound") including an ionizing radiation curable functional group. Examples of the ionizing radiation curable functional group include ethylenic unsaturated linking groups such as (meth) acryloyl groups, vinyl groups, and allyl groups, epoxy groups, oxetanyl groups, and the like. The ionizing radiation-curable compound is preferably a compound having an ethylenic unsaturated linking group, and more preferably a compound having two or more ethylenic unsaturated linking groups, and among them, a polyfunctional (meth)acrylate-based compound having two or more ethylenic unsaturated linking groups is still more preferred. As the polyfunctional (meth)acrylate-based compound, any of monomers and oligomers can be used.

Ionizing radiation refers to, among electromagnetic rays and charged particle radiation, a ray having an energy quantum high enough to polymerize or crosslink molecules, and generally, an ultraviolet ray (UV) or an electron beam (EB) is used, and additionally, electromagnetic waves such as an X-ray and a γ ray and charged particle radiation such as an α ray and an ion ray can also be used.

Among the polyfunctional (meth)acrylate-based compounds, examples of bifunctional (meth)acrylate-based monomers include ethylene glycol di(meth)acrylate, bisphenol A tetraethoxy diacrylate, bisphenol A tetrapropoxy diacrylate, 1,6-hexandiol diacrylate, and the like.

Examples of tri- or more functional (meth)acrylate-based monomers include trimethylolpropane tri(meth)acrylate, pentaerythritol tri(meth)acrylate, pentaerythritol tetra(meth) acrylate, dipentaerythritol hexa(meth)acrylate, dipentaerythritol tetra(meth)acrylate, isocyanurate-denatured tri(meth) acrylate, and the like.

In addition, the (meth)acrylate-based monomers may be monomers having a partially-denatured molecular frame, and it is also possible to use monomers denatured using ethylene oxide, propylene oxide, caprolactone, isocyanuric acid, alkyl, cyclic alkyl, aromatic series, bisphenol, or the like.

Examples of polyfunctional (meth)acrylate-based oligomers include acrylate-based polymers such as urethane (meth)acrylate, epoxy (meth)acrylate, polyester (meth)acrylate, and polyether (meth)acrylate; and the like.

Urethane (meth)acrylate can be obtained by, for example, the reaction of a polyvalent alcohol, an organic diisocyanate, and hydroxyl (meth)acrylate.

In addition, epoxy (meth)acrylate is preferably (meth) acrylate obtained by reacting a tri- or more functional aromatic epoxy resin, an alicyclic epoxy resin, an aliphatic epoxy resin, or the like and (meth)acrylic acid, (meth) acrylate obtained by reacting a bi- or more functional aromatic epoxy resin, an alicyclic epoxy resin, an aliphatic epoxy resin, or the like, a polybasic acid, and (meth)acrylic acid, or (meth)acrylate obtained by reacting a bi- or more functional aromatic epoxy resin, an alicyclic epoxy resin, an aliphatic epoxy resin, or the like, phenols, and (meth)acrylic acid.

The ionizing radiation-curable compound can be singly used, or a combination of two or more ionizing radiation-curable compounds can be used.

In a case in which the ionizing radiation-curable compound is an ultraviolet-curable compound, the ionizing radiation-curable composition preferably includes additives such as a photopolymerization initiator and a photopolymerization accelerator.

As the photopolymerization initiator, it is possible to select one or more from acetophenone, benzophenone, α-hydroxy alkylphenone, Michler's ketone, benzoin, benzyl methyl ketone, benzoyl benzoate, α-acyloxim ester, thioxanthones, and the like.

The photopolymerization initiator preferably has a melting point of 100° C. or higher. When the melting point of the photopolymerization initiator is set to 100° C. or higher, it is possible to prevent the sublimation of the photopolymerization initiator remaining due to heat during the formation of transparent conductive films for touch panels or the crystallization step, and the impairing of a decrease in the resistance of transparent conductive films.

The photopolymerization accelerator is capable of increasing the curing rate by reducing polymerization hindrances caused by the air during curing, and, for example, one or more selected from p-dimethyl amino benzoic acid isoamyl ester, p-dimethylamino benzoic acid ethyl ester, and the like can be used.

From the viewpoint of the suppression of curling and the balance between mechanical strength, hardness, and toughness, the thickness of the uneven layer is preferably in a range of 2 μm to 10 μm, and more preferably in a range of 4 μm to 8 μm.

The thickness of the uneven layer can be obtained by, for example, measuring thicknesses at 20 places selected from an image of a cross-section captured using a scanning transmission electron microscope (STEM), and calculating the average value of the values of the 20 places. The acceleration voltage of the STEM is preferably set in a range of 10 kV to 30 kV, and the magnification is preferably set in a range of 1000 times to 7000 times.

For the coating fluid for forming an uneven layer, generally, a solvent is used to adjust viscosity or enable the dissolution or dispersion of individual components. Since the surface state of the uneven layer that has been subjected to coating and drying processes differs depending on the kind of the solvent, the solvent is preferably selected in consideration of the saturated vapor pressure of the solvent, the permeability of the solvent in the transparent base material, and the like. Specifically, examples of the solvent include ketones (acetone, methyl ethyl ketone, methyl isobutyl ketone, cyclohexanone, and the like), ethers (dioxane, tetrahydrofuran, and the like), aliphatic hydrocarbons (hexane and the like), alicyclic hydrocarbons (cyclohexane and the like), aromatic hydrocarbons (toluene, xylene, and the like), halogenated carbons (dichloromethane, dichloroethane, and the like), esters (methyl acetate, ethyl acetate, butyl acetate, and the like), alcohols (butanol, cyclohexanol, and the like), cellosolves (methyl cellosolve, ethyl cellosolve, and the like), cellosolve acetates, sulfoxides (dimethyl sulfoxides and the like), amides (dimethyl formamide, dimethyl acetamide, and the like), and the like, and a mixture of the above-described solvents may be used.

In a case in which the drying of the solvent is too slow or too fast, the levelling properties of the uneven layer become excessive or insufficient, and thus it becomes difficult to form the above-described uneven shape. Therefore, as the solvent, it is preferable to make a solvent having an evaporation rate (the relative evaporation rate when the evaporation rate of n-butyl acetate is set to 100) in a range of 100 to 180 account for 50% by mass or more of the solvent. The solvent accounting for 50% by mass or more of the solvent more preferably has an evaporation rate in a range of 100 to 150.

Examples of the evaporation rate are 195 for toluene, 465 for methyl ethyl ketone (MEM, 118 for methyl isobutyl ketone (MIBK), and 68 for propylene glycol monomethyl ether (PGME).

In addition, the kind of the solvent also has an influence on the dispersibility of the inorganic ultrafine particles represented by ultrafine silica particles. For example, MIBK is preferred since MIBK has excellent dispersibility of inorganic ultrafine particles, and easily form the above-described uneven shape.

From the viewpoint of facilitating the obtainment of the above-described uneven shape, it is preferable to control the drying conditions when the uneven layer is formed. The drying conditions can be adjusted using the drying temperature and the wind speed in a dryer. Specifically, the drying temperature is preferably set in a range of 30° C. to 120° C., and the wind speed is preferably set in a range of 0.2 m/s to 50 m/s. In order to control the levelling of the uneven layer using the drying conditions, it is preferable to carry out the application of ionizing radiation after drying.

From the viewpoint of facilitating the obtainment of the above-described uneven shape by make the surface unevenness appropriately smooth, a levelling agent is preferable added to the coating fluid for forming an uneven layer. Examples of the levelling agent include fluorine-based levelling agents and silicone-based levelling agents, and silicone-based levelling agents are preferred. The amount of the levelling agent added is preferably in a range of 0.01% by mass to 0.5% by mass, and more preferably in a range of 0.05% by mass to 0.2% by mass with respect to all the solid content of the coating fluid for forming an uneven layer.

The transparent base material for the optical sheet preferably has transparency, smoothness, and heat resistance, and is preferably excellent in terms of mechanical strength. Examples of the transparent base material include plastic films such as polyester, triacetyl cellulose (TAC), cellulose diacetate, cellulose acetate butyrate, polyamide, polyimide, polyether sulfone, polysulfone, polypropylene, polymethyl pentene, polyvinyl chloride, polyvinyl acetal, polyether ketone, acryl, polycarbonate, polyurethane, and amorphous olefin (cyclo-olefin-polymer: COP). The transparent base material may be a combination of two or more plastic films attached together.

Among them, from the viewpoint of mechanical strength or dimensional stability, stretched, and particularly, biaxially-stretched polyester (polyethylene terephthalate or polyethylene naphthalate) is preferred. TAC and acryl are preferred from the viewpoint of transparency or optical isotropy. COP and polyester are preferred due to their excellent weather resistance. In addition, plastic films having a retardation value in a range of 3000 nm to 30000 nm or plastic films having a ¼ wavelength phase difference are preferred since it is possible to prevent the observation of color unevenness on a display screen in a case in which an image on a liquid crystal display is observed through polarized sunglasses.

The thickness of the transparent base material is preferably in a range of 5 μm to 300 μm, and more preferably in a range of 30 μm to 200 μm.

To improve adhesiveness, in addition to physical treatments such as a corona discharge treatment and an oxidation treatment, the application of paint called an anchor agent or a primer may be carried out on the surface of the transparent base material in advance.

The optical sheet may include functional layer such as an anti-reflection layer, an anti-fouling layer, and an antistatic layer on the uneven shape and/or on the surface opposite to the uneven shape. In addition, in the case of a constitution in which the uneven layer is provided on the transparent base material, functional layers may be provided between the transparent base material and the uneven layer in addition to the above-described places.

[Display Device]

A display device of the present invention is a display device including an optical sheet on the front surface of a display element having a pixel density of 300 ppi or more, in which the optical sheet has an uneven shape on a surface, and the uneven shape satisfies at least one condition selected from the following (A) to (C), Condition (A); the gap between the inclination angles indicating the half value of the peak value of the inclination angle distribution curve of the uneven shape is in a range of 5 degrees to 15 degrees, Condition (B); the inclination angle indicating an inflection point on the positive direction side of the inclination angle indicating the peak value of the inclination angle distribution curve of the uneven shape is in a range of 4 degrees to 15 degrees, and the difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, the skewness of the inclination angle distribution curve of the uneven shape is in a range of 0 degrees to 1.5 degrees, and/or the kurtosis of the inclination angle distribution curve of the uneven shape is in a range of 1.5 to 6.

In ultrahigh-definition display elements having a pixel density of 300 ppi or more, scintillation is likely to occur as described above; however, in the present invention, it is possible to prevent scintillation while a variety of characteristics such as anti-glare properties are imparted by using a specific optical sheet as the optical sheet having an uneven shape.

As the optical sheet used in the display device of the present invention, it is possible to use the same one as the optical sheet used in the above-described touch panel of the present invention.

Examples of the display element include liquid crystal display elements, in-cell touch panel liquid crystal display elements, EL display elements, plasma display elements, and the like.

The in-cell touch panel liquid crystal display elements have functions of resistance film-type, electrostatic capacitance-type, optical-type, and other-type touch panels in the liquid crystal element obtained by interposing liquid crystals between two glass substrates. Examples of the display method of liquid crystals in the in-cell touch panel liquid crystal element include an IPS method, a VA method, a multi-domain method, an OCB method, a STN method, a TSTN method, and the like. The in-cell touch panel liquid crystal element is described in, for example, Japanese Unexamined Patent Application Publication No. 2011-76602 and Japanese Unexamined Patent Application Publication No. 2011-222009.

The optical sheet can be installed on the front surface of the display element, for example, in the following orders.

(1) The display element/a surface protection plate/the optical sheet
(2) The display element/the optical sheet
(3) The display element/a touch panel including the optical sheet
(4) The display element/the optical sheet/a surface protection plate In the case of (1) and (2), the optical sheet is disposed so that the uneven surface faces the surface (the uneven surface faces opposite to the display element), whereby it is possible to impart high-degree anti-glare properties, prevent scintillation, and furthermore, make damage generated on the surface or the display element rarely visible.

In the case of (3), the optical sheet is disposed as in the embodiment of the above-described touch panel of the present invention, whereby it is possible to impart a variety of characteristics such as anti-glare properties, and prevent scintillation.

In the case of (2) and (4), when the optical sheet is disposed through an air layer so that the uneven surface faces the display element, it is possible to prevent adhesion and interference fringes, and make damage generated in the display element rarely visible.

The optical sheet used in the display device of the present invention is capable of suppressing the reflection of external light even in bright outdoor environments and imparting high-degree anti-glare properties. Since recent handheld information terminals represented by smartphones are frequently used outdoors, the display device of the present invention is preferably used so that the uneven surface of the optical sheet faces viewers (opposite to the display element).

[Optical Sheet]

An optical sheet of the present invention is an optical sheet having an uneven shape on a surface, in which the uneven shape satisfies at least one condition selected from the following (A) to (C), and the optical sheet is used for a front surface of a display element having a pixel density of 300 ppi or more, Condition (A); the gap between the inclination angles indicating the half value of the peak value of the inclination angle distribution curve of the uneven shape is in a range of 5 degrees to 15 degrees, Condition (B); the inclination angle indicating an inflection point on the positive direction side of the inclination angle indicating the peak value of the inclination angle distribution curve of the uneven shape is in a range of 4 degrees to 15 degrees, and the difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, the skewness of the inclination angle distribution curve of the uneven shape is in a range of 0 degrees to 1.5 degrees, and/or the kurtosis of the inclination angle distribution curve of the uneven shape is in a range of 1.5 to 6.

As the optical sheet of the present invention, it is possible to use the same one as the optical sheet used in the above-described touch panel of the present invention.

The optical sheet of the present invention is preferably used on the front surface of a display element having a pixel density of 300 ppi or more since it is possible to impart a variety of characteristics such as anti-glare properties, and prevent the scintillation of image light and a decrease in the resolution in ultrahigh-definition display elements.

The optical sheet of the present invention is capable of suppressing the reflection of external light even in bright outdoor environments and imparting high-degree anti-glare properties. Since recent handheld information terminals represented by smartphones are frequently used outdoors, the optical sheet of the present invention is preferably used so that the uneven surface of the optical sheet faces viewers (opposite to the display element) on the outermost surface of a touch panel or a display device.

[Method for Selecting an Optical Sheet]

A method for selecting an optical sheet of the present invention is a method for selecting an optical sheet having an uneven shape on the surface and being used for the front surface of a display element having a pixel density of 300 ppi or more, in which the inclination angles of the uneven shape of the optical sheet are measured, and an optical sheet satisfying at least one condition selected from the following (A) to (C) is selected as the optical sheet, Condition (A); the gap between the inclination angles indicating the half value of the peak value of the inclination angle distribution curve of the uneven shape is in a range of 5 degrees to 15 degrees, Condition (B); the inclination angle indicating an inflection point on the positive direction side of the inclination angle indicating the peak value of the inclination angle distribution curve of the uneven shape is in a range of 4 degrees to 15 degrees, and the difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, the skewness of the inclination angle distribution curve of the uneven shape is in a range of 0 degrees to 1.5 degrees, and/or the kurtosis of the inclination angle distribution curve of the uneven shape is in a range of 1.5 to 6.

In the method for selecting an optical sheet of the present invention, it is possible to select an optical sheet having favorable scintillation prevention properties when being used in ultrahigh-definition display elements having a pixel density of 300 ppi or more without incorporating the optical sheet into a display device, thereby efficiently manage the qualities of optical sheets.

The determination conditions for selecting an optical sheet may be only one of Conditions (A) to (C), two of Conditions (A) to (C), or all of Conditions (A) to (C).

The inclination angle in Condition (A) is preferably set in a range of 5 degrees to 12 degrees, and more preferably in a range of 6 degrees to 10 degrees.

The inclination angle indicating the inflection point in Condition (B) is preferably in a range of 5 degrees to 12 degrees, more preferably in a range of 5.5 degrees to 10 degrees, and still more preferably in a range of 6 degrees to 8.5 degrees. The angle difference in Condition (B) is preferably in a range of 2.5 degrees to 9 degrees, more preferably in a range of 2.8 degrees to 8 degrees, and still more preferably in a range of 2.8 degrees to 5 degrees.

The inclination angle indicating the peak value in Condition (C) is preferably in a range of 2.1 degrees to 7 degrees, and more preferably in a range of 2.1 degrees to 6 degrees.

In the present invention, it is possible to select an optical sheet capable of more precisely preventing scintillation by, furthermore, using Additional Conditions (1) and/or (2) described below as the determination conditions.

Additional Condition (1); the proportion of inclination angles in a range of 0 degrees to 1.25 degrees in the inclination angles of the uneven shape is 20% or less in terms of cumulative percentage.

Additional Condition (2); the proportion of inclination angles of more than 15 degrees in the inclination angles of the uneven shape is 3% or less in terms of cumulative percentage.

The cumulative percentage of Additional Condition (1) is preferably 15% or less, and more preferably 12% or less. The cumulative percentage of Additional Condition (2) is preferably 2% or less, and more preferably 1.5% or less.

Conditions (A) and/or (B) described above preferably further satisfy one or more conditions selected from Additional Conditions (3) to (5) described below.

Additional Condition (3); the inclination angle indicating the peak value of the inclination angle distribution curve is in a range of 2 degrees to 8 degrees.

Additional Condition (4); the skewness of the inclination angle distribution of the uneven shape is in a range of 0 to 1.5.

Additional Condition (5); the kurtosis of the inclination angle distribution of the uneven shape is in a range of 1.5 to 6.

The inclination angle of Additional Condition (3) is more preferably in a range of 2.1 degrees to 7 degrees, and still more preferably in a range of 2.1 degrees to 6 degrees.

The skewness of Additional Condition (4) is more preferably in a range of 0 to 1.4, and still more preferably in a range of 0 to 1.2.

The kurtosis of Additional Condition (5) is more preferably in a range of 2 to 6, and still more preferably in a range of 2.5 to 6.

Conditions (A) and/or (C) described above preferably further satisfy one or more conditions selected from Additional Conditions (6) and/or (7) described below.

Additional Condition (6); the inclination angle (the inclination angle indicating the inflection point on the positive direction side) indicating the inflection point on the positive direction side of the inclination angle indicating the peak value of the inclination angle distribution curve is in a range of 4 degrees to 15 degrees.

Additional Condition (7); the difference between the inclination angle indicating the inflection point and the inclination angle indicating the peak value ([the inclination angle indicating the inflection point on the positive direction side]−[the inclination angle indicating the peak value]) is in a range of 2.2 degrees to 10 degrees.

The inclination angle of Additional Condition (6) is more preferably in a range of 5 degrees to 12 degrees, still more preferably in a range of 5.5 degrees to 10 degrees, and far still more preferably in a range of 6 degrees to 8.5 degrees.

The inclination angle difference of Additional Condition (7) is more preferably in a range of 2.5 degrees to 9 degrees, still more preferably in a range of 2.8 degrees to 8 degrees, and fare still more preferably in a range of 2.8 degrees to 5 degrees.

[Method for Manufacturing an Optical Sheet]

A method for manufacturing an optical sheet of the present invention is a method for manufacturing an optical sheet having an uneven shape on a surface and being used for a front surface of a display element having a pixel density of 300 ppi or more, in which the uneven shape is manufactured so as to satisfy at least one condition selected from the following (A) to (C), Condition (A); the gap between the inclination angles indicating the half value of the peak value of the inclination angle distribution curve of the uneven shape is in a range of 5 degrees to 15 degrees, Condition (B); the inclination angle indicating an inflection point on the positive direction side of the inclination angle indicating the peak value of the inclination angle distribution curve of the uneven shape is in a range of 4 degrees to 15 degrees, and the difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, the skewness of the inclination angle distribution curve of the uneven shape is in a range of 0 degrees to 1.5 degrees, and/or the kurtosis of the inclination angle distribution curve of the uneven shape is in a range of 1.5 to 6.

In the method for manufacturing an optical sheet of the present invention, it is essential to control the manufacturing conditions so that at least one of Conditions (A) to (C) are satisfied. The preferable ranges for Conditions (A) to (C) are the same as in the above-described method for selecting an optical sheet.

In addition, as additional conditions, it is preferable to satisfy Additional Conditions (1) and/or (2) for the above-described method for selecting an optical sheet. Regarding Conditions (A) and/or (B), it is preferable to satisfy one or more conditions selected from Additional Conditions (3) to (5) for the above-described method for selecting an optical sheet. Regarding Conditions (A) and/or (C), it is preferable to satisfy Additional Conditions (6) and/or (7) for the above-described method for selecting an optical sheet.

In the method for manufacturing an optical sheet of the present invention, it is possible to efficiently manufacture an optical sheet capable of imparting a variety of characteristics such as anti-glare properties, and preventing the scintillation of image light in ultrahigh-definition display elements having a pixel density of 300 ppi or more.

Manufacturing Conditions (A) to (C) and (1) to (7) can be controlled by extremely decreasing substantially smooth places in the uneven layer of the optical sheet, forming a shape so that the uneven layer becomes generally inclined, and providing a variety of inclination angles including large inclination angles instead of making the entire uneven layer uniformly inclined.

As specific means for controlling Manufacturing Conditions (A) to (C) and (1) to (7), in a case in which the uneven layer is formed using a mold, it is possible to control the shape of the mold. In addition, examples of specific means for controlling Manufacturing Conditions (A) to (C) and (1) to (7) in a case in which the uneven layer is formed through coating include, as described above, the use of an appropriate amount of inorganic ultrafine particles, the used of a solvent having a relative evaporation rate in a specific range, the adjustment of the drying conditions such as the drying temperature or the wind speed, and the used of an appropriate amount of the levelling agent.

EXAMPLES

Hereinafter, the present invention will be described in more detail using examples, but the present invention is by no means limited by the examples. Unless otherwise particularly described, "parts" and "%" are mass-based.

1. Measurement and Assessment of the Properties of the Optical Sheets

The properties of the optical sheets of Examples and Comparative Examples were measured and assessed as described below. The results are described in Table 1.

[Inclination Angle Distribution of the Uneven Shape of the Optical Sheet]

A glass plate was attached to a surface of each of optical sheets obtained in Examples and Comparative Examples opposite to the surface on which an anti-glare layer (uneven layer) was formed through a transparent adhesive, thereby producing a sample, and the surface shapes of the optical sheets were measured and interpreted using a white interference microscope (New View 7300, manufactured by Zygo Corporation) under the following conditions. As the measurement and analysis software, Microscope Application of MetroPro ver 8.3.2 was used.

(Measurement Conditions)
Object lens: 50 times
Zoom: 1 time
Measurement region: 414 μm×414 μm
Resolution (gap between points): 0.44 μm
(Analysis Conditions)
Removed: None
Filter: Band Pass
Filter type: Gauss Spline
Low wavelength: 800 μm
High wavelength: 3 μm
Remove spikes: on
Spike Height (xRMS): 2.5

The low wavelength corresponds to the cut-off value λc in the roughness parameter.

Next, a Slope Mag Map screen was displayed using the analysis software (MetroPro ver 8.3.2-Microscope Application), and a histogram was displayed on the screen with nBins set to 100, thereby obtaining the histogram data of a three-dimensional surface inclination angle distribution. On the basis of the obtained histogram data, the full width at half maximum, the cumulative percentage of inclination angles in a specific range, the average inclination angle, the inclination angle indicating the peak value, the inflection point on the positive direction side, the skewness, and the kurtosis were calculated. The bin widths of individual class angles in the histogram were in a range of 0.1 degrees to 0.5 degrees. The results are described in Table 1.

In the calculation of the full width at half maximum and the peak value, the approximated curve (inclination angle distribution curve) was produced through the linear interpolation of the values of the intervals of the individual class angles of the obtained histogram data, and the full width at half maximum and the peak value were calculated from the curve.

In the calculation of the cumulative percentage of the inclination angles in the specific range, the cumulative percentages of the individual class angles were obtained from the obtained histogram, and the cumulative percentage of the inclination angles in the specific range was calculated through the linear interpolation thereof.

In calculation of the inflection point, for each of the individual class angles of the obtained histogram data, a value was obtained by subtracting the frequency of the previous class (the class of smaller angles) from the frequency of the subject class, and the class angle at which the value reached the maximum negative absolute value was considered as the inflection value.

The three-dimensional average inclination angle, skewness, and kurtosis from the histogram data of the inclination angle distribution of the uneven shape were calculated as described below.

When the typical angle and frequency of the $i^{th}$ interval of the histogram data are represented by $\theta_i$ and $f_i$, the three-dimensional average inclination angle m is calculated using Equation (5) described below.

$$m = \sum_{i=1}^{nBins} \theta_i \cdot f_i / N \quad (5)$$

Here, N represents the number of all data, and is calculated using Equation (6) described below.

$$N = \sum_{i=1}^{nBins} f_i \quad (6)$$

The skewness Sk and the kurtosis Ku are calculated using Equations (7) and (8) described below.

$$Sk = \frac{1}{sd^3 \cdot N} \cdot \sum_{i=1}^{nBins} (\theta_i - m)^3 \cdot f_i \quad (7)$$

$$Ku = \frac{1}{sd^4 \cdot N} \cdot \sum_{i=1}^{nBins} (\theta_i - m)^4 \cdot f_i \quad (8)$$

Here, sd represents the standard deviation, and is calculated using Equation (9) described below.

$$sd = \sqrt{\sum_{i=1}^{nBins} (\theta_i - m)^2 \cdot f_i / N} \quad (9)$$

[Ra, Rz, and Smp of the Optical Sheet]

"Ra" and "SRz" were marked on a surface map screen using the surface shape data obtained when the above-described surface inclination angle distribution was calculated and the same interpretation conditions, and the respective values were considered as the Ra and Rz of the optical sheet.

Next, "Save Data" buttons were marked on the Surface Map screen, and three-dimension curve roughness data after the analysis were stored. In addition, the stored data were loaded using an Advanced Texture Application, and the following analysis conditions were applied.

(Analysis Conditions)
High FFT filter: off
Low FFT filter: off
Remove: plane

Next, a peak/valleys screen was displayed, and the number of peaks was counted from "Peaks Stats". At this time, to avoid the counting of meaningless peaks, only peaks having an area that was $1/10000$ or more of the area (414×414 μm²) of the entire measurement region and a height of $1/10$ or more of Rtm were counted. Rtm can be scanned from the "Roughness/Waviness Map" screen, and represents the average of the maximum heights of individual sections when the entire measurement region was divided into 3×3 sections. In addition, Smp was calculated on the basis of Equation (4) described above.

[Scintillation]

In each of the optical sheets of Examples and Comparative Examples, the surface on which the anti-glare layer of the optical sheet was not formed and the glass surface on which a matrix of a black matrix (having a glass thickness of 0.7 mm) was not formed were attached together using a transparent adhesive. A white surface light source (manufactured by Hakuba, LIGHTBOX, average luminance of 1000 cd/m²) was installed on the specimen obtained in the above-described manner on the black matrix side, thereby falsely causing scintillation. The scintillation was image-captured using a CCD camera (KP-M1, C mount adapter, extension tube; PK-11A Nikon, camera lens; 50 mm, F1.4s NIKKOR) from the optical sheet side. The distance between the CCD camera and the optical sheet was set to 250 mm, and the focus of the CCD camera was adjusted so as to lie on the optical sheet. An image captured using the CCD camera was scanned using a personal computer, and was interpreted using image-processing software (ImagePro Plus ver. 6.2; manufactured by Media Cybernetics, Inc.).

First, an assessment place of 200×160 pixels was selected from the scanned image, and the assessment place was converted to the 16-bit grayscale. Next, the low pass filter was selected from the enhancement tab of the filter command, and the filter was applied under conditions of "3×3, passes: 3, strength: 10". Therefore, components derived from the black matrix pattern were removed. Next, flatten was selected, and shading correction was carried out under conditions of "background: dark, feature width: 10". Next, the contrast was accentuated to "contrast: 96 and brightness: 48" using the contrast enhancement command. The obtained image was converted to the 8-bit grayscale, and the variation in the values of individual pixels of 150×110 pixels in the image was calculated as the standard deviation, thereby digitalizing the scintillation. It can be said that, as the digitalized scintillation value decreases, scintillation occurs less. Assessment was carried out on two images having black matrixes that were equivalent to a pixel density of 350 ppi and a pixel density of 200 ppi.

[Anti-Glare Properties]

An assessment sample obtained by attaching a black acryl plate to the base material side of the obtained optical sheet through a transparent adhesive was placed on a horizontal surface, a fluorescent lamp was disposed 1.5 m above the assessment sample, a visual sense was assessed from a variety of angles under conditions of the illuminance over the assessment sample set in a range of 800 to 1200, and was assessed according to the following standards.

A: The image of the fluorescent lamp cannot be recognized at any angles.

B: The image of the fluorescent lamp is reflected, the outline of the fluorescent lamp blurs, and the boundary portion of the outline cannot be recognized.

C: The image of the fluorescent lamp is reflected as on a mirror surface, and the outline of the outline (the boundary portion of the outline) cannot be clearly recognized.

[Contrast (Dark Room)]

In the measurement of the contrast ratio, a cold-cathode tube equipped with a diffuser plate was used as the backlight unit, two polarization plates (manufactured by Samsung, AMN-3244TP) were used, the contrast ($L_1$) when an anti-glare film (a transparent base material+ an anti-glare layer) was mounted on the outermost surface and the contrast ($L_2$) when only a transparent base material was mounted on the outermost surface were obtained by dividing $L_{max}$ of the luminance of light passing through the polarization plates installed in parallel nicols by $L_{min}$ of the luminance of light passing through the polarization plates installed in cross nicols, and ($L_1/L_2$)×100(%) was calculated, thereby calculating the contrast ratio.

The luminance was measured using a luminance colorimeter (manufactured by Topcon Corporation, BM-5A) in a dark room environment having an illuminance of 5 Lx or less. The measurement angle of the luminance colorimeter was set to 1°, and the luminance was measured at a viewing field of φ5 mm from the vertical direction over the sample. Regarding the light intensity of the back light, the back light was installed so that the luminance when two polarization plates were installed in parallel nicols reached 3600 cd/m² in a state in which the sample was not installed.

[Haze]

First, the haze (total haze) was measured using a haze meter (HM-150, manufactured by Murakami Color Research Laboratory Co., Ltd.) according to JIS K-7136: 2000. In addition, a 80 μm-thick TAC film (manufactured by Fujifilm Corporation, TD80UL) was attached to the surface of the optical sheet through a transparent adhesive so as to smooth the uneven shape, and the haze was measured in a state in which the influence of the haze caused by the surface shape was removed, thereby obtaining the internal haze (Hi). In addition, the surface haze (Hs) was obtained by subtracting the internal haze value from the total haze value. Light was incident on the base material-side surface.

[Total Light Transmittance]

The total light transmittance of the optical sheet was measured using a haze meter (HM-150, Murakami Color Research Laboratory Co., Ltd.) according to JIS K7361-1: 1997. Light was incident on the base material-side surface.

[Clarities of Transmitted Images]

Four transmitted image clarities that had passed through optical combs including 2 mm, 1 mm, 0.5 mm, and 0.125 mm width were measured using an image clarity meter (trade name: ICM-1T) manufactured by Suga Test Instruments Co., Ltd. according to JIS K7105:1981, and the sum thereof was calculated.

[White Muddiness]

A sample was produced by attaching the transparent base material-side surface of the optical sheet and a black acryl plate through a transparent adhesive. For the produced sample, a turbid sense was observed according to the following standards under a desk lamp including a three-wavelength fluorescent lightning tube as a light source in a dark room.

A: No white is observed.
C: White is observed.

[Visibility of Scratch Damage]

The uneven surface of a sample optical sheet produced in the assessment of white muddiness was rubbed once using #0000 steel wool at a load of 100 g/cm$^2$, and damage on the surface was visually assessed. As a result, optical sheets having no noticeable damage were assessed as "A", and optical sheets having noticeable damage were assessed as "C".

[Interference Fringes]

Two optical sheets were overlapped together so that the uneven surface side of one optical sheet and the transparent base material side of the other optical sheet faced each other. As a result, optical sheets in which no interference fringes were generated were assessed as "A", and optical sheets in which interference fringes were generated were assessed as "C".

2. Production of an Optical Sheet

Example 1

A coating fluid for anti-glare layers 1 having the following formulation was applied onto a transparent base material (80 μm-thick triacetyl cellulose resin film (TAC), manufactured by Fujifilm Corporation, TD80UL), was dried at 70° C. at a wind speed of 5 m/s for 30 seconds, and then an ultraviolet ray was applied in a nitrogen atmosphere (having an oxygen concentration of 200 ppm or less) so that the integral of light reached 100 mJ/cm$^2$ so as to form an anti-glare layer, thereby obtaining an optical sheet. The film thickness of the anti-glare layer was 7.5 μm.

<Coating Fluid for Anti-Glare Layers 1>

| | |
|---|---|
| Pentaerythritol triacrylate (manufactured by Nippon Kayaku Co., Ltd., KAYARAD-PET-30) | 10 parts |
| Urethan acrylate (manufactured by the Nippon Synthetic Chemical Industry Co., Ltd., UV1700B) | 45 parts |
| Photopolymerization initiator (manufactured by BASF, IRGACURE184) | 3 parts |
| Silicone-based levelling agent (manufactured by Momentive Performance materials Inc., TSF4460) | 0.2 parts |
| Transmissive particles (manufactured by Sekisui Chemical Co., Ltd., spherical polyacryl-styrene copolymer) (average particle diameter: 6 μm, refractive index: 1.535) | 12 parts |
| Inorganic ultrafine particles (manufactured by Nissan Chemical Industries Ltd., silica having a reactive functional group introduced into the surface, solvent: MIBK, solid content: 30%) (average particle diameter: 12 nm) | 160 parts |
| Solvent 1 (MIBK) | 110 parts |

Example 2

An optical sheet was obtained in the same manner as in Example 1 except for the fact that the amount of the transmissive particles and the inorganic ultrafine particles in Example 1 were changed to 10 parts and 170 parts.

Example 3

An optical sheet was obtained in the same manner as in Example 1 except for the fact that the amount of the transmissive particles and the inorganic ultrafine particles in Example 1 were changed to 15 parts and 150 parts.

Comparative Example 1

An optical sheet was obtained in the same manner as in Example 1 except for the fact that the coating fluid for anti-glare layers 1 in Example 1 was changed to a coating fluid for anti-glare layers 2 having the following formulation, and the film thickness of the anti-glare layer (uneven layer) was set to 2 μm.

<Coating Fluid for Anti-Glare Layers 2>

| | |
|---|---|
| Pentaerythritol triacrylate (manufactured by Nippon Kayaku Co., Ltd., KAYARAD-PET-30) | 100 parts |
| Fine inorganic particles (manufactured by Fuji Silysia Chemical Ltd., gel method amorphous silica) (hydrophobic treatment, average particle diameter (laser diffraction scattering method): 4.1 μm) | 14 parts |
| Photopolymerization initiator (manufactured by BASF, IRGACURE184) | 5 parts |
| Silicone-based levelling agent (manufactured by Momentive Performance materials Inc., TSF4460) | 0.2 parts |
| Solvent 1 (toluene) | 150 parts |
| Solvent 2 (MIBK) | 35 parts |

Comparative Example 2

An optical sheet was obtained in the same manner as in Example 1 except for the fact that the coating fluid for anti-glare layers 1 in Example 1 was changed to a coating fluid for anti-glare layers 3 having the following formulation, and the film thickness of the anti-glare layer (uneven layer) was set to 4.5 μm.

<Coating Fluid for Anti-Glare Layers 3>

| | |
|---|---|
| Pentaerythritol triacrylate (manufactured by Nippon Kayaku Co., Ltd., KAYARAD-PET-30) | 90 parts |
| Acryl polymer (manufactured by Mitsubishi Rayon Co., Ltd., molecular weight: 75,000) | 10 parts |
| Photopolymerization initiator (manufactured by BASF, IRGACURE184) | 3 parts |
| Silicone-based levelling agent (manufactured by Momentive Performance materials Inc., TSF4460) | 0.1 parts |
| Transmissive particles (manufactured by Soken Chemical & Engineering Co., Ltd., spherical polytyrene particles) (average particle diameter: 3.5 μm, refractive index: 1.59) | 12 parts |
| Solvent 1 (toluene) | 145 parts |
| Solvent 2 (cyclohexanone) | 60 parts |

Comparative Example 3

An optical sheet was obtained in the same manner as in Example 1 except for the fact that the coating fluid for anti-glare layers 1 in Example 1 was changed to a coating fluid for anti-glare layers 4 having the following formulation, and the film thickness of the anti-glare layer (uneven layer) was set to 7.0 μm.

<Coating Fluid for Anti-Glare Layers 4>

| | |
|---|---|
| Pentaerythritol triacrylate (manufactured by Nippon Kayaku Co., Ltd., KAYARAD-PET-30) | 38 parts |
| Isocyanurate EO-denatured triacrylate (manufactured by Toagosei Co., Ltd., M-313) | 22 parts |
| Photopolymerization initiator (manufactured by BASF, IRGACURE184) | 5 parts |
| Silicone-based levelling agent (manufactured by Momentive Performance materials Inc., TSF4460) | 0.1 parts |
| Transmissive particles (manufactured by Soken Chemical & Engineering Co., Ltd., spherical polyacryl-styrene copolymer) (particle diameter: 5 μm, refractive index: 1.525) | 20 parts |
| Inorganic ultrafine particles (manufactured by Nissan Chemical Industries Ltd., silica having a reactive functional group introduced into the surface, solvent: MIBK, solid content: 30%) (average particle diameter: 12 nm) | 120 parts |
| Solvent 1 (toluene) | 135 parts |

Comparative Example 4

An optical sheet was obtained in the same manner as in Example 1 except for the fact that the coating fluid for anti-glare layers 1 in Example 1 was changed to a coating fluid for anti-glare layers 5 having the following formulation, and the film thickness of the anti-glare layer (uneven layer) was set to 5.0 μm.

<Coating Fluid for Anti-Glare Layers 5>

| | |
|---|---|
| Pentaerythritol triacrylate (manufactured by Nippon Kayaku Co., Ltd., KAYARAD-PET-30) | 38 parts |
| Isocyanurate EO-denatured triacrylate (manufactured by Toagosei Co., Ltd., M-313) | 22 parts |
| Photopolymerization initiator (manufactured by BASF, IRGACURE184) | 5 parts |
| Silicone-based levelling agent (manufactured by Momentive Performance materials Inc., TSF4460) | 0.1 parts |
| Transmissive particles (manufactured by Soken Chemical & Engineering Co., Ltd., spherical polyacryl-styrene copolymer) (particle diameter: 3.5 μm, refractive index: 1.545) | 12 parts |
| Inorganic ultrafine particles (manufactured by Nissan Chemical Industries Ltd., silica having a reactive functional group introduced into the surface, solvent: MIBK, solid content: 30%) (average particle diameter: 12 nm) | 120 parts |
| Solvent 1 (toluene) | 135 parts |

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| Uneven shape | Full width at half width (degrees) | 7.5 | 9.7 | 5.2 | 4.6 | 3.1 | 3.3 | 3.2 |
| | Peak value (degrees) | 4.9 | 2.2 | 3.0 | 2.3 | 1.3 | 2.0 | 1.2 |
| | Proportion of 0 degrees to 5 degrees (%) | 48.5 | 51.6 | 73.0 | 72.0 | 99.0 | 93.1 | 89.9 |
| | Proportion of 0 degrees to 1.25 degrees (%) | 5.9 | 11.9 | 10.3 | 13.4 | 33.5 | 22.1 | 27.1 |
| | Proportion of 15 degrees or more (%) | 1.2 | 0.3 | 0.2 | 0.0 | 0.0 | 0.0 | 0.0 |
| | Inflection point (degrees) | 7.9 | 10.3 | 6.0 | 3.9 | 3.2 | 3.8 | 3.3 |
| | Inflection point-peak value (degrees) | 3.0 | 8.1 | 3.0 | 1.6 | 1.9 | 1.8 | 2.1 |
| | Skewness | 0.97 | 0.39 | 1.15 | 1.51 | 0.71 | 1.65 | 1.57 |
| | Kurtosis | 4.7 | 2.8 | 5.8 | 6.3 | 3.7 | 8.9 | 7.3 |
| | Three-dimensional average inclination angle (°) | 5.7 | 5.2 | 4.0 | 4.1 | 2.0 | 2.6 | 2.6 |
| | Ra (μm) | 0.448 | 0.303 | 0.272 | 0.376 | 0.160 | 0.134 | 0.169 |
| | Rz (μm) | 2.498 | 1.382 | 1.477 | 2.172 | 0.663 | 0.902 | 0.907 |
| | Smp (μm) | 69.0 | 32.7 | 51.0 | 71.0 | 106.9 | 49.1 | 48.8 |
| Optical characteristics | Total haze (%) | 42.9 | 48.3 | 39.4 | 23 | 39.6 | 24 | 23.1 |
| | Surface haze (%) | 30.9 | 38.8 | 28.2 | 21.2 | 11.4 | 12 | 11.9 |
| | Internal haze (%) | 12 | 9.5 | 11.2 | 1.8 | 28.2 | 12 | 11.2 |
| | Total light transmittance (%) | 90.5 | 90.7 | 90.3 | 90.8 | 90.8 | 90.9 | 91 |
| | transmitted image clarity | 34 | 75.2 | 21.1 | 20 | 115.8 | 150.3 | 145.5 |
| Assessment | Scintillation 350 ppi | 13.5 | 13.7 | 14.3 | 26 | 16.6 | 17.7 | 20 |
| | Scintillation 200 ppi | 11.8 | 11.2 | 12 | 19.4 | 12.3 | 13 | 14.5 |
| | Contrast | 65 | 68 | 64 | 60 | 35 | 68 | 68 |
| | Anti-glare properties | A | A | A | A | B | B | B |
| | White muddiness | A | A | A | A | A | A | A |
| | Visibility of scratch damage | A | A | A | A | A | A | A |
| | Interference fringe | A | A | A | A | A | A | A |

As is clear from the results of Table 1, the optical sheets of Examples 1 to 3 were capable of imparting a variety of characteristics such as anti-glare properties and preventing scintillation in ultrahigh-definition display elements having a pixel density of 300 ppi or more, and furthermore, were excellent in terms of contrast. In addition, the optical sheets of Examples 1 to 3 exhibited far better effects than the optical sheets of Comparative Examples 1 to 4 in terms of scintillation-preventing properties in display elements having a pixel density of 350 ppi or more, but had similar effects to the optical sheets of Comparative Examples 1 to 4 in terms of scintillation-preventing properties in display elements having a pixel density of 200 ppi or more. From what has been described above, it is found that the optical sheets of Examples 1 to 3 are extremely useful for ultrahigh-definition display elements having a pixel density of 300 ppi or more. The anti-glare properties were assessed in an environment of a luminance in a range of 800 Lx to 1200 Lx, but the optical sheets of Examples 1 to 3 had favorable anti-glare properties even in outdoor environment having an illuminance of 10000 Lx or more.

3. Production of Touch Panels

A 20 nm-thick ITO conductive film was formed on the transparent base material side of each of the optical sheets of Examples 1 to 3 and Comparative Examples 1 to 4 using the sputtering method, thereby producing an upper electrode plate. Next, a 20 nm-thick ITO conductive film was formed on one surface of a 1 mm-thick reinforced glass plate using the sputtering method, thereby producing a lower electrode plate. Subsequently, as a coating fluid for spacers, an ionizing radiation-curable resin (Dot Cure TR5903: manufactured by Taiyo Ink MFG. Co., Ltd.) was printed in a dot shape on the surface of the lower electrode plate including the conductive film using the screen printing method, and then an ultraviolet ray was applied using a high-pressure mercury lamp, thereby arraying spacers having a diameter of 50 μm and a height of 8 μm at intervals of 1 mm.

Next, the upper electrode plate and the lower electrode plate are disposed so that the conductive films faced each other, and edges thereof were adhered using double-sided adhesive tape having a thickness of 30 μm and a width of 3 mm, thereby producing resistance film-type touch panels of Examples 1 to 3 and Comparative Examples 1 to 4.

The obtained resistance film-type touch panel was mounted on a commercially available ultrafine-definition liquid crystal display device (having a pixel density of 350 ppi), and the occurrence of scintillation was visually observed. As a result, in the touch panels of Examples 1 to 3, scintillation was suppressed, only a small amount of external light was reflected, and visibility was favorable. In addition, in the touch panels of Examples 1 to 3, the resolution of ultrafine-definition images was not impaired, and the contrast was also favorable in light room environments. On the other hand, in the touch panels of Comparative Examples 1 to 4, scintillation was noticed. In addition, in the touch panel of Comparative Example 2, the internal haze of the optical sheet was relatively high, and thus the resolution of ultrahigh-definition images was slightly impaired.

4. Production of Display Devices

The optical sheet of each of Examples 1 to 3 and Comparative Examples 1 to 4 and a commercially available ultrafine-definition liquid crystal display device (having a pixel density of 350 ppi) were attached together through a transparent adhesive, thereby producing display device of each of Examples 1 to 3 and Comparative Examples 1 to 4. During the attachment, the uneven surface of the optical sheet was made to face opposite to the display element.

As a result of visually assessing the occurrence of scintillation in the obtained display devices, in the display devices of Examples 1 to 3, scintillation was suppressed, only a small amount of external light was reflected, and visibility was favorable. In addition, in the display devices of Examples 1 to 3, the resolution of ultrafine-definition images was not impaired, and the contrast was also favorable in light room environments. On the other hand, in the display devices of Comparative Examples 1 to 4, scintillation was noticed. In addition, in the display device of Comparative Example 2, the internal haze of the optical sheet was relatively high, and thus the resolution of ultrahigh-definition images was slightly impaired.

The invention claimed is:

1. In a touch panel, the improvement comprising an optical sheet as a component of the touch panel, the optical sheet having an uneven shape on a surface, the uneven shape satisfying at least one condition selected from the following (A) to (C), and the touch panel being used for a front surface of a display element having a pixel density of 300 ppi or more,
   Condition (A); a gap between inclination angles indicating a half value of a peak value of an inclination angle distribution curve of the uneven shape is in a range of 5 degrees to 15 degrees,
   Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and
   Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

2. The touch panel according to claim 1,
   wherein the optical sheet further satisfies Additional Condition (1) described below,
   Additional Condition (1); a proportion of inclination angles in a range of 0 degrees to 1.25 degrees in inclination angles of the uneven shape is 20% or less in terms of cumulative percentage.

3. The touch panel according to claim 1,
   wherein the optical sheet further satisfies Additional Condition (2) described below,
   Additional Condition (2); a proportion of inclination angles of 15 degrees or more in the inclination angles of the uneven shape is 3% or less in terms of cumulative percentage.

4. In a display device, the improvement in which the display device comprises a display element having a pixel density of 300 ppi or more and an optical sheet on a front surface of the display element, wherein the optical sheet has an uneven shape on a surface, and the uneven shape satisfies at least one condition selected from the following (A) to (C), Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

5. An optical sheet having an uneven shape on a surface, wherein the uneven shape satisfies at least one condition selected from the following (A) to (C), and the optical sheet is useful for a front surface of a display element having a pixel density of 300 ppi or more, Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

6. The optical sheet according to claim 5,
wherein the optical sheet further satisfies Additional Condition (1) described below, Additional Condition (1); a proportion of inclination angles in a range of 0 degrees to 1.25 degrees in inclination angles of the uneven shape is 20% or less in terms of cumulative percentage.

7. The optical sheet according to claim 5,
wherein the optical sheet further satisfies Additional Condition (2) described below, Additional Condition (2); a proportion of inclination angles of 15 degrees or more in the inclination angles of the uneven shape is 3% or less in terms of cumulative percentage.

8. A method for manufacturing an optical sheet having an uneven shape on a surface and being useful for a front surface of a display element having a pixel density of 300 ppi or more, the method comprising:

applying to a transparent base material a coating fluid for forming an uneven layer having the uneven shape on the surface, the coating fluid comprising a resin component and transmissive particles, wherein the uneven shape is manufactured so as to satisfy at least one condition selected from the following (A) to (C), Condition (A); a gap between inclination angles indicating a half value of a peak value of an inclination angle distribution curve of the uneven shape is in a range of 5 degrees to 15 degrees, Condition (B); an inclination angle indicating an inflection point on a positive direction side of the inclination angle indicating the peak value of the inclination angle distribution curve of the uneven shape is in a range of 4 degrees to 15 degrees, and a difference between the inclination angle indicating the inflection point on the positive direction side and the inclination angle indicating the peak value of the inclination angle distribution curve is in a range of 2.2 degrees to 10 degrees, and Condition (C); the inclination angle indicating the peak value of the inclination angle distribution curve of the uneven shape is in a range of 2 degrees to 8 degrees, skewness of the inclination angle distribution curve of the uneven shape is in a range of 0 degrees to 1.5 degrees, and/or kurtosis of the inclination angle distribution curve of the uneven shape is in a range of 1.5 to 6.

* * * * *